(12) United States Patent
Fisher et al.

(10) Patent No.: US 9,384,179 B2
(45) Date of Patent: Jul. 5, 2016

(54) AUTOMATED COMPOSITION EVALUATOR

(71) Applicant: American Chemical Society, Washington, DC (US)

(72) Inventors: Jeffrey Fisher, Fripp Island, SC (US); David Paul Levy, Hilliard, OH (US); John Sullivan, Laurel, MD (US)

(73) Assignee: American Chemical Society, Washington, DC (US)

( * ) Notice: Subject to any disclaimer, the term of this patent is extended or adjusted under 35 U.S.C. 154(b) by 210 days.

(21) Appl. No.: 14/020,724

(22) Filed: Sep. 6, 2013

(65) Prior Publication Data

US 2014/0075273 A1 Mar. 13, 2014

Related U.S. Application Data

(60) Provisional application No. 61/698,437, filed on Sep. 7, 2012.

(51) Int. Cl.
*G06F 17/00* (2006.01)
*G06F 17/24* (2006.01)
*G06F 17/21* (2006.01)
*G06F 17/22* (2006.01)

(52) U.S. Cl.
CPC .............. *G06F 17/24* (2013.01); *G06F 17/212* (2013.01); *G06F 17/2264* (2013.01)

(58) Field of Classification Search
CPC . G06F 17/211; G06F 17/212; G06F 17/2264; G06F 17/248
See application file for complete search history.

(56) References Cited

U.S. PATENT DOCUMENTS

| | | | | |
|---|---|---|---|---|
| 5,893,123 A * | 4/1999 | Tuinenga | | 715/209 |
| 6,006,240 A * | 12/1999 | Handley | | 715/220 |
| 7,308,643 B1 * | 12/2007 | Zhu et al. | | 715/206 |
| 7,448,022 B1 * | 11/2008 | Ram | | G06F 8/00 717/120 |
| 2005/0108001 A1 * | 5/2005 | Aarskog | | G06F 17/271 704/10 |
| 2005/0257201 A1 * | 11/2005 | Rose | | G06F 17/30908 717/136 |
| 2007/0055933 A1 * | 3/2007 | Dejean et al. | | 715/533 |
| 2007/0079236 A1 * | 4/2007 | Schrier | | G06F 17/217 715/206 |
| 2008/0028300 A1 * | 1/2008 | Krieger et al. | | 715/255 |
| 2009/0198488 A1 * | 8/2009 | Vigen | | G06F 17/2785 704/9 |
| 2009/0254838 A1 * | 10/2009 | Rao et al. | | 715/749 |

(Continued)

OTHER PUBLICATIONS

Fateman, Richard J., et al, Optical Character Recognition and Parsing of Typeset Mathematics, dated Oct. 30, 1995; from the Computer Science Division, EECS Dept, University of California Berkeley, 30 pages.*

(Continued)

*Primary Examiner* — Laurie Ries
(74) *Attorney, Agent, or Firm* — Finnegan, Henderson, Farabow, Garrett & Dunner, LLP

(57) ABSTRACT

Systems and methods are provided for evaluating composition of a first file representing a document to be evaluated. An evaluation method transforms the first file to a second file. The second file includes a plurality of objects corresponding to the composition of the first file. The evaluation method also determines parameters based on the plurality of objects; evaluates the parameters based on a plurality of composition rules provided by a rule engine; generates evaluation findings and stores the evaluation findings; and generates an evaluation conclusion based on the evaluation findings. The evaluation conclusion indicates compliance of the document according to the composition rules.

30 Claims, 14 Drawing Sheets

(56) References Cited

U.S. PATENT DOCUMENTS

| | | | |
|---|---|---|---|
| 2010/0174980 A1* | 7/2010 | Mansfield et al. | 715/234 |
| 2011/0169924 A1* | 7/2011 | Haisty et al. | 348/51 |
| 2012/0324341 A1 | 12/2012 | Dejean | |
| 2013/0144605 A1* | 6/2013 | Brager | G06F 17/3061 704/9 |
| 2013/0174017 A1* | 7/2013 | Richardson et al. | 715/234 |
| 2013/0205202 A1* | 8/2013 | Xiao et al. | 715/249 |
| 2013/0227397 A1* | 8/2013 | Tvorun et al. | 715/235 |

OTHER PUBLICATIONS

Notification of Transmittal of the Int'l Search Report and the Written Opinion of the Int'l Searching Authority, or the Declaration; related to Application No. PCT/US13/58629; dated (mailing) Mar. 13, 2014 (1 pg.).

International Search Report relating to Application No. PCT/US13/58629; dated (mailing) Mar. 13, 2014 (2 pgs.).

Written Opinion of the Int'l Searching Authority related to Application No. PCT/US13/58629; dated (mailing) Mar. 13, 2014 (7 pgs.).

Fateman, Richard J. et al.; "Optical Character Recognition and Parsing of Typeset Mathematics"; dated Oct. 30, 1995; from the Computer Science Division, EECS Dep., University of California at Berkeley (30 pgs.).

* cited by examiner

AUTOMATED COMPOSITION EVALUATOR

CROSS REFERENCE TO RELATED APPLICATION

This application claims the benefit of priority to U.S. provisional Application No. 61/698,437 filed with the United States Patent and Trademark Office on Sep. 7, 2012, and entitled "AUTOMATED COMPOSITION EVALUATION," which is hereby incorporated by reference in its entirety.

FIELD

The subject matter of the present application is generally related to systems, methods, and computer software for automated composition evaluation; in particular, for evaluation of whether the compositions of one or more documents comply with a pre-determined format.

BACKGROUND

Documents, such as scientific documents, may include various content objects such as texts, tables, mathematic equations, and graphics. It is often desirable to place these various content objects in a manner such that the documents have a standard format, which may enable convenient operations of the documents. For example, by placing scientific documents in a standard format, certain operations of the documents, such as reading, editing, searching, comparing, and publishing, may become less burdensome. Moreover, complying with a standard format may also provide additional benefits such as creating of a consistent appearance of the published journals, reducing future design efforts, and increasing efficiencies in journal production processes and IT maintenance due to the elimination of journal specific requirements.

The current process for placing documents in compliance with the standard format, however, is mostly performed manually. As a result, the verification process of the scientific documents for standard format compliance may be time-consuming, labor intensive, error prone and expensive. It is accordingly an object to provide a method, system, and computer software to perform automated composition evaluation of the documents for the purpose standard format compliance.

SUMMARY

In one embodiment, a computer-implemented method is disclosed for evaluating composition of a first file representing a document to be evaluated. The method can be performed by one or more processors operatively coupled to one or more memory devices. The method includes transforming the first file to a second file. The second file includes a plurality of objects corresponding to the composition of the first file, and the plurality of objects includes at least one text object. Additionally, the method includes determining one or more parameters based on the plurality of objects. The one or more parameters includes one or more text parameters associated with the at least one text object, one or more page parameters associated with at least one page of the document, and one or more document parameters associated with the document. The method further includes evaluating the one or more parameters based on a plurality of composition rules provided by a rule engine. The method further includes generating evaluation findings and storing the evaluation findings in the one or more memory devices; and generating an evaluation conclusion based on the evaluation findings. The evaluation conclusion indicates compliance of the document according to the composition rules.

In another embodiment, a non-transitory computer-readable storage medium is disclosed. The computer-readable storage medium stores instructions that, when executed by a computer, cause the computer to perform a method of evaluating composition of a first file representing a document to be evaluated. The method can be performed by one or more processors operatively coupled to one or more memory devices. The method includes transforming the first file to a second file. The second file includes a plurality of objects corresponding to the composition of the first file, and the plurality of objects includes at least one text object. Additionally, the method includes determining one or more parameters based on the plurality of objects. The one or more parameters includes one or more text parameters associated with the at least one text object, one or more page parameters associated with at least one page of the document, and one or more document parameters associated with the document. The method further includes evaluating the one or more parameters based on a plurality of composition rules provided by a rule engine. The method further includes generating evaluation findings and storing the evaluation findings in the one or more memory devices; and generating an evaluation conclusion based on the evaluation findings. The evaluation conclusion indicates compliance of the document according to the composition rules.

In another embodiment, a system is disclosed for evaluating composition of a first file representing a document to be evaluated. The system includes a processor that is configured to transform the first file to a second file. The second file includes a plurality of objects corresponding to the composition of the first file, and the plurality of objects include at least one text object. Additionally, the system also includes an interpreter that is configured to determine one or more parameters based on the plurality of objects. The one or more parameters includes one or more text parameters associated with the at least one text object, one or more page parameters associated with at least one page of the document, and one or more document parameters associated with the document. The system further includes an evaluator that is configured to evaluate, based on a plurality of composition rules provided by a rule engine, the one or more parameters; generate evaluation findings and store the evaluation findings in one or more memory devices; and generate an evaluation conclusion based on the evaluation findings, the evaluation conclusion indicating compliance of the document according to the composition rules.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments and aspects of the disclosed embodiments and, together with the description, serve to explain the principles of the disclosed embodiments. In the drawings.

DETAILED DESCRIPTION

Reference will now be made in detail to the disclosed exemplary embodiments, examples of which are illustrated in the accompanying drawings. Wherever possible, the same reference numbers will be used throughout the drawings to refer to the same or like parts.

Methods, systems, and articles of manufacture relating to the disclosed embodiments provide features for evaluating composition of various documents such as journal articles, academic papers, blog articles, newspaper articles, and web-based articles or contents, particularly in the journal publishing industries.

Figure 1:
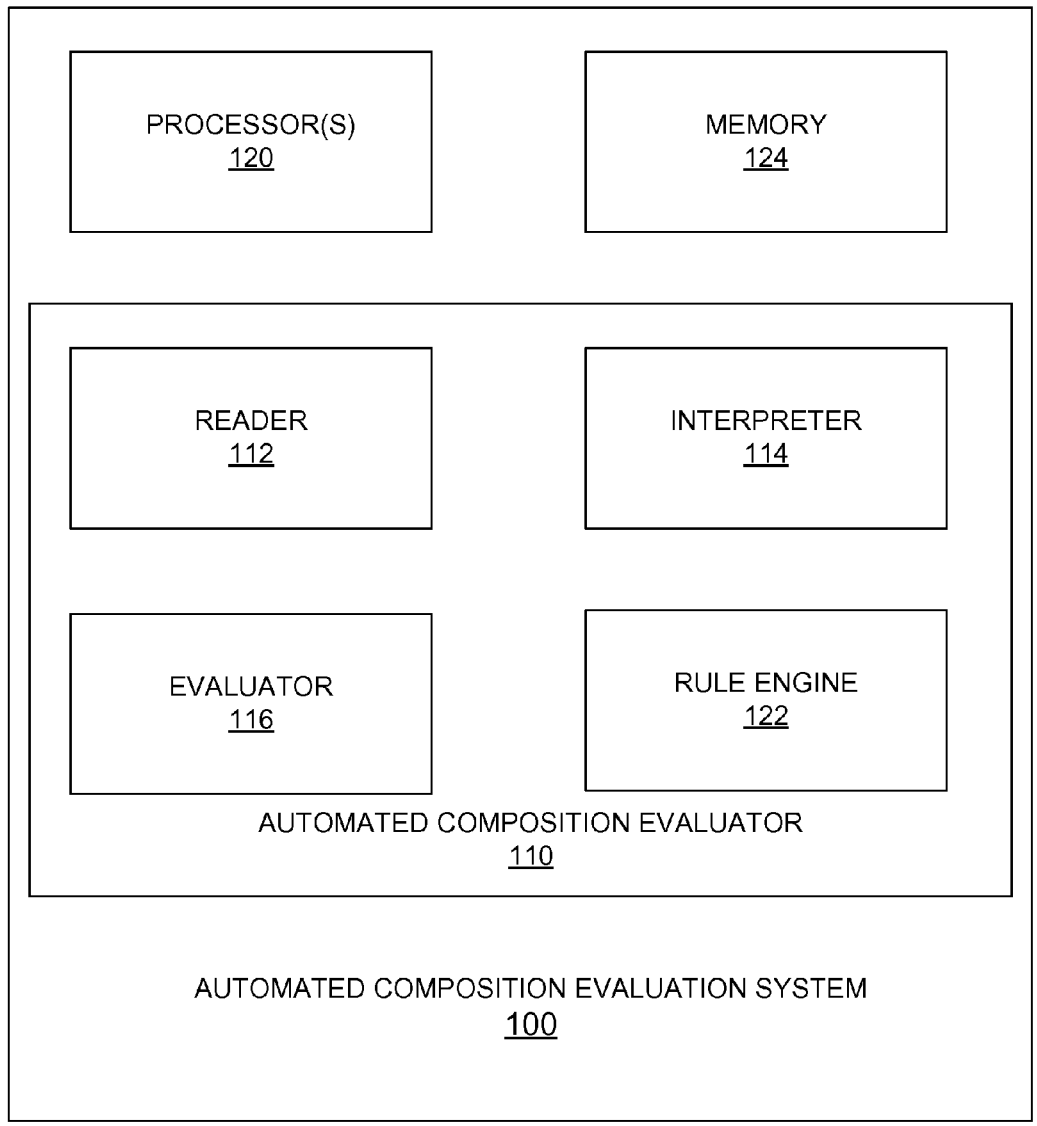
FIG. 1 illustrates an exemplary system environment consistent with certain disclosed embodiments.

FIG. 1 illustrates an exemplary automated composition evaluation system 100 consistent with certain disclosed embodiments. In one aspect, automated composition evaluation system 100 may include automated composition evaluator 110, one or more processors 120, and memory 124. Automated composition evaluator 110 may include reader 112, interpreter 114, evaluator 116, and rule engine 122.

Consistent with the disclosure, reader 110 may perform various functions to input, such as to read, receive, or obtain, an external file, such a scientific document, the format of which needs to be evaluated. For inputting the file, reader 110 may include, for example, a disk reading interface; a network interface such as an Ethernet interface, a Wi-Fi interface, a Bluetooth interface, a cellular interface; a USB interface, a HDMI interface, a Lightning™ interface, or other similar interfaces capable of reading or importing an external file. When reader 110 inputs the external file, it may send or transmit the inputted file to interpreter 114. Interpreter 114 may interpret, transform, or otherwise convert the inputted file and generate a file that is in an evaluable format, which is discussed in detail corresponding to FIG. 2 below. Briefly, a file having an evaluable format may include composition information that is capable of being processed by evaluator 116. Evaluator 116 may evaluate the composition information based on a set of composition rules that are defined in rule engine 122. Details of the evaluation process are discussed with reference to FIGS. 2-8.

Consistent with disclosed embodiments, components of automated composition evaluation system 100, including automated composition evaluator 110, may include one or more processors 120 as shown in exemplary form in FIG. 1. The processor(s) may include one or more processing devices, such as microprocessors from Intel's Core™, Xeon™, and Atom™ families or AMD's Turion™, Phenom™, Athlon™, and Sempron™ families. The processor(s) may include a single core or multiple core processor system that provides the ability to perform parallel processes simultaneously.

For example, the processor(s) may include single core processors configured with virtual processing technologies known to those skilled in the art. In certain embodiments, the processor(s) may include logical processors that simultaneously execute and control multiple processes. The processor(s) may implement virtual machine technologies, or other similar known technologies to provide the ability to execute, control, run, manipulate, store, etc., multiple software processes, applications, programs, etc. In some embodiments, the processor(s) may include a multiple-core processor arrangements (e.g., dual or quad core) configured to provide parallel processing functionalities to enable computer components of automated composition evaluation system 100 to execute multiple processes simultaneously.

Other types of processor arrangements may be implemented that provide for the capabilities disclosed herein. For example, the processor may represent one or more servers or other computing devices that are associated with automated composition evaluation system 100. For instance, the processor may represent a distributed network of processors configured to operate together over a local or wide area network. Alternatively, the processor(s) may include a processing device configured to execute software instructions that receive and send information, instructions, etc., to/from other processing devices associated with automated composition evaluator 110 or other components of automated composition evaluation system 100. In certain aspects, processor(s) 120 may be configured to execute software instructions stored in memory to perform one or more processes consistent with disclosed embodiments.

Consistent with disclosed embodiments, components of automated composition evaluation system 100, including automated composition evaluator 110, may also include one or more memory devices (such as memory 124) as shown in exemplary form in FIG. 1. The memory device(s) may store software instructions that are executed by processor(s) 120, respectively, such as instructions associated with one or more applications, network communication processes, operating system software, software instructions relating to the disclosed embodiments, and any other type of application or software known to be executable by processing devices. The memory device(s) may include volatile or non-volatile, magnetic, semiconductor, tape, optical, removable, nonremovable, or other types of storage devices or tangible computer-readable media. The memory device(s) may include two or more memory devices distributed over a local or wide area network, or may include a single memory device. In disclosed embodiments, the memory device(s) may include database systems, such as database storage devices, configured to receive instructions to access, process, and send information stored in the storage devices.

In some embodiments, automated composition evaluator 110 may also include one or more additional components (not shown) that provide communications with other components of automated composition evaluation system 100, such as through a network (not shown), or any other suitable communications infrastructure.

Such a network may include any type of network that facilitates communications and data transfer between components of automated composition evaluation system 100, such as, for example, automated composition evaluator 110, processor(s) 120, memory 123, a database (not shown), an external storage device (not shown), a user input device (not shown), an output device (not show), etc.

The network may include a Local Area Network (LAN), a Wide Area Network (WAN), such as the Internet, and may include a single network or a combination of networks. Further, the network may reflect a single type of network or a combination of different types of networks, such as the Internet and public exchange networks for wired and/or wireless communications. The network may utilize cloud computing technologies. Moreover, any part of the network may be implemented through infrastructures or channels of trade to permit operations associated with financial accounts that are performed manually or in-person by the various entities illustrated in FIG. 1. The network is not limited to the above examples and automated composition evaluation system 100 may implement any type of network that allows the entities (and others not shown) included in FIG. 1 to exchange data and information.

Although FIG. 1 describes a certain number of entities and processing/computing components within automated composition evaluation system 100, any number or combination of components may be implemented without departing from the scope of the disclosed embodiments. As described above, for example, reader 112, interpreter 114, evaluator 116, rule engine 122 may also communicate with each other through a network. Additionally, automated composition evaluator 110, processor 120, and memory 124 are not mutually exclusive. For example, in one disclosed embodiment, automated composition evaluator 110, processor 120, and memory 124 may be implemented by separate components, and may be associated with the same entity or with different entities. Moreover, reader 112, interpreter 114, evaluator 116, and rule engine 122 may not be mutually exclusive; for example, reader 112 and interpreter 114 may be associated with the same entity, different locations of the same entity, subsidiaries of the same entity, or a parent entity and its subsidiary. Similarly, evaluator 116 and rule engine 122 may be associated with the same entity, different locations of the same entity, subsidiaries of the same entity, or a parent entity and its subsidiary. Thus, the entities as described are not limited to the discrete descriptions above. Further, where different components of automated composition evaluation system 100 are combined (e.g., evaluator 116 and rule engine 122, etc.), the computing and processing devices and software executed by these components may be integrated into a local or distributed system.

Figure 2:
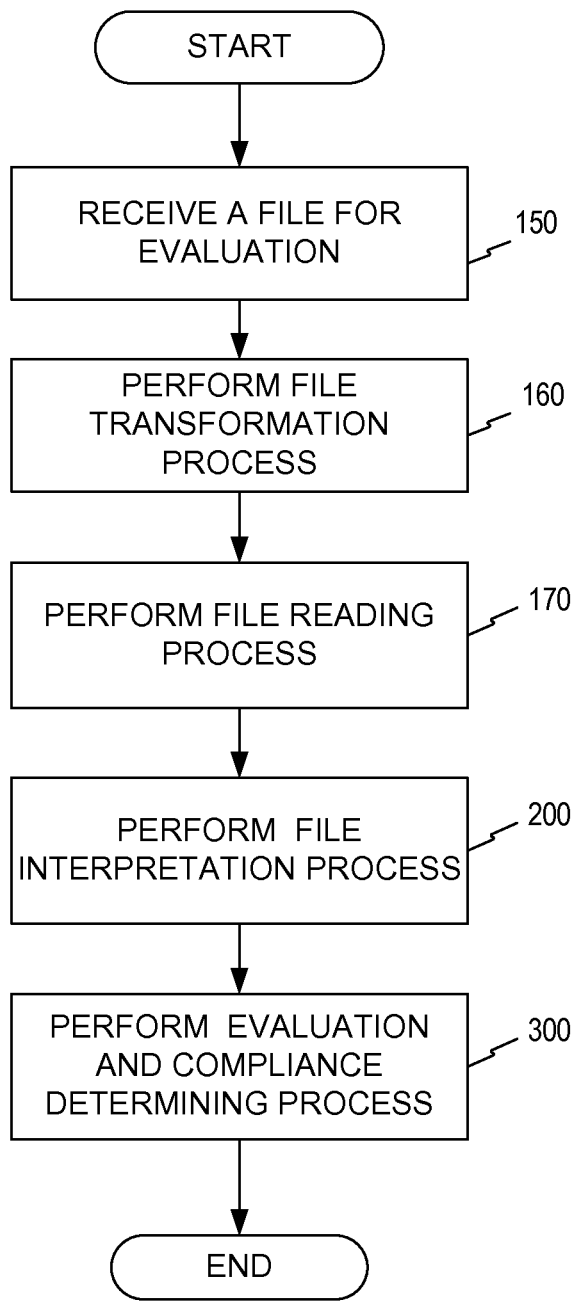
FIG. 2 is a flowchart of an exemplary automated composition evaluation process consistent with certain disclosed embodiments.

As disclosed, the components, processes, and embodiments herein enable automated composition evaluation system 100 to evaluate, adjust, and edit compositions of a file, such as a scientific document. FIG. 2 is a flowchart of an exemplary automated composition evaluation process 140 consistent with certain disclosed embodiments. In certain embodiments, automated composition evaluator 110, processor(s) 120, memory 124, and other components (not shown) of automated composition evaluation system 100 may execute software instructions to perform file composition evaluation process 140 of FIG. 2. Each step of process 140 is described below in further detail.

In one aspect, automated composition evaluation system 100 executes software instructions to receive a file, such as a document, for evaluation (Step 150). The file may be a scientific document, including texts, tables, equations, graphics, charts, and any other objects that may exist in the document. The file may be in the format of Microsoft Word, Microsoft Powerpoint, Adobe PDF, a markup language file, or another format.

A markup language file uses a markup language to annotate a text document in a way that is syntactically distinguishable from the text. Examples of markup languages include Extensible Markup Language (XML) and HyperText Markup Language (HTML). A markup language often includes special characters such as tags to indicate the annotation. As an example, in XML, a markup string begins with an opening tag "<" and ends with a closing tag ">". Tags may also be used to indicate sections of a markup file. Thus, for example, a section related to "evaluating a document" may begin with <eval_document 1> and end with <level document 1>.

In one embodiment, processor(s) 120 executes software instructions from memory 124 to perform a file transformation process (Step 160). As part of the file transformation process of Step 160, the file received in Step 150 may be transformed or converted to an evaluable file that automated composition evaluator 110 is able to process. As an example, the file received in Step 150 may be an application-generated XML document and may be transformed to an evaluator-standard XML file during the file transformation process of Step 160. An evaluable file, such as an evaluator-standard XML file, may also be referred to hereafter as a metrics file. The transformation may be implemented by, for example, Extensible Stylesheet Language Transformation (XSLT). XSLT is a language for transforming XML documents into other XML documents and other objects such as HTML (for web pages), or into XSL Formatting Objects which may then be converted to Portable Document Format (PDF), PostScript and Portable Network Graphics (PNG) formats. Exemplary XML file obtained by the file transformation process of Step 160 that may be implemented by XSLT, is shown below.

```
<?xml version="1.0" encoding="UTF-8"?>
<eval_document mse_new"zz0101010" sz_units="mm">
    <eval_page physical_no="1" logical_no="235"
            sz_width="207.9625" sz_height="276.225">>
        <eval_para maxConsecutiveHyphens=""
        maxInterlineSpacing="">
            <eval_line sz x="14.8158"
            sz_y="51.8583" sz_area_left="14.8158"
                sz_area_right="192.0875" sz_area_top="45.5083"
                sz_area_bottom="51.8583" sz_th="3.5278" sz_tlb="0"
                sz_tvs="0" sz_twb="2.0959" hyphenated="yes"/>
        </eval_para>
    </eval_page>
</eval_document>
```

In the above example, the metrics file may have a format similar to that of a standard application-generated XML file, but may also include some additional information pertaining to the document being evaluated. Similar to the standard application-generated XML file, the metrics file may include strings, characters, and objects that constitute markup portions. As an example, strings that constitute markup portions may begin with the character "<" and end with a ">". These strings are referred to as tags. These tags may include, e.g., start-tags, end-tags, and empty-element tags. In the above illustration of an exemplary evaluator-standard XML file, <eval_document mse_new"zz0101010" sz_units="mm"> is a start-tag, and </eval_document> is an end-tag. A logical document component either begins with a start-tag and ends with a matching end-tag or consists only of an empty-element tag, such as <line-break/>.

In one embodiment, during the file transformation process of Step 160, processor(s) 120 executes software instructions from memory 124 to extract, categorize, re-arrange, or otherwise transform the file received in Step 150 to a metrics file, such as an evaluator-standard XML file. As an example, in the above illustrative metrics file, parameters associated with text lines are indicates by the "eval_line" tag; parameters associated with pages are indicated by the "eval_page" tags; and so on. The parameters in the above illustrative metrics file are described in detail corresponding to FIGS. 3A and 3B. In short, the parameters may represent characteristics of objects such as text lines, tables, equations, graphics, pages, and documents. Parameters may include numerical parameters, such as the "x" and "y" coordinates of the line parameters shown in the above illustrative metrics file. Parameters may also include textual, Boolean, qualitative, or in any other desirable forms. Although the above illustrative metrics file demonstrates a certain number of parameters associated with a certain number of objects, a metrics file may include any number of parameters and any number of objects.

The type of objects included in the metrics file may include text lines, paragraphs, tables, equations, graphics, columns, pages, documents, and/or any combination of the foregoing objects, such as frames. A frame may include one or more of the same type or different type of objects. For example, a frame may include several lines of texts or paragraphs that are close to each other. A frame may also include several tables. A metrics file may include objects, frames, or combination of the two.

In addition to the markup portion, a metrics file may also include strings, characters, objects, and frames that constitute content portion, which may not be associated with tags. Content includes substantive materials in the file received during Step 150, such as the composition of texts, tables, equations, and graphics in the original document. A metrics file may include one or both markup portions and content portions.

During the file transformation process of Step 160, processor(s) 120 may execute software instructions stored in memory 124 to process the composition information of the file received in Step 150 in different manners. As an example, if the received file is a standard application-generated XML file containing all available composition information, processor(s) 120 may execute software instructions to extract, sort, copy, categorize, or otherwise transform the composition information to a number of objects such as tables, equations, graphics, columns, pages, and documents; and generate a corresponding metrics file. Alternatively, if the file received in Step 150 is, for example, a plain text file, a Microsoft Word file, or an Adobe PDF file, processor(s) 120 may first create tags identifying different objects in the file, e.g., by transforming it into a standard XML file, and then generate the metrics file. In addition, processor(s) 120 may also correct any formatting errors that may exist in the file received in Step 150. In some embodiments, the file transformation process of Step 160 may also be performed by automated composition evaluator 110 (such as by interpreter 114) with or without processor(s) 120 and memory 124.

In one embodiment, reader 112 of automated composition evaluator 110 may execute software instructions to perform a file reading process (Step 170). Reader 112 may obtain the metrics file generated in file transformation process of Step 160. Reader 112 may store the metrics file in memory 124 or any other storage component of the automated composition evaluated system 100.

In some embodiments, interpreter 114 may perform a file interpretation process (Step 200). Interpreter 114 may take the metrics file generated in file transformation process of Step 160 as the input file, or take both the metrics file and the file received in Step 150 as the input files. As an example, interpreter 114 may first take the metrics file and determine whether the metrics file include the desired composition information for evaluation. If all the desired composition information is available, interpreter 114 may proceed to interpret the metrics file. If, however, interpreter 114 determines that some desired composition information is missing, it may attempt to interpret the missing information itself (as will be described below) or may attempt to obtain the missing information from the file received in Step 150. For example, if the metrics file does not include width information of a table object, interpreter 114 may obtain that information directly from the file received in Step 150. If, however, interpreter 114 cannot obtain information that is required, interpreter 114 may terminate the interpretation process of Step 200, or may continue the interpretation process but report an error message.

If interpreter 114 determines that all desired composition information is available in the metrics file, may be obtained from the file received in Step 150, or may be interpreted, interpreter 114 may perform the file interpretation process (Step 200). Step 200 is described in detail corresponding to FIGS. 3A-3B. In brief, interpreter 114 may obtain composition information associated with a plurality of objects in the metric files and generate one or more parameters, which may be used in the evaluation and compliance determination process (Step 300). As an example, if interpreter 114 determines that some desired parameters, such as maximum consecutive hyphens (maxConsecutiveHyphens) or maximum inter-line spacing (maxInterlineSpacing), is missing in the metrics file, it may attempt to calculate or derive the missing information from the metrics file. If the metrics file includes the number of consecutive hyphens for each consecutive hyphen instance, or includes the number of inter-line spacing for all lines, interpreter 114 may calculate the corresponding maximum values of the numbers to obtain the missing maxConsecutiveHyphens and maxInterlineSpacing. If, however, the metrics file does not include the foregoing number information, interpreter 114 may attempt to obtain it from the file received in Step 150, before it may calculate the maximum values.

In some embodiments, evaluator 116 may perform the evaluation and compliance determination process (Step 300). The evaluation and compliance determination process of Step 300 is described in detail corresponding to FIGS. 5A-5E and 6-8. In brief, evaluator 116 may evaluate the parameters generated by the file interpretation process of Step 200, based on a plurality of composition rules supplied by rule engine 122. The composition rules may be used to determine, for example, whether the file received in Step 150 complies with a pre-set standard. The composition rules may be pre-configured by rule engine 122 and loaded to memory 124 of automated composition evaluation system 100. The composition rules may also be updated as desired.

Evaluator 116 may evaluate the parameters by, for example, comparing the parameters to the composition rules. Using the parameter maxConsecutiveHyphens as an example, if the composition rule for maxConsecutiveHyphens sets a threshold of four, then occurrence of more than four consecutive hyphens will result in a finding that the maximum consecutive hyphens exceeds the threshold. Evaluator 116 may then generate a conclusion based on the findings and determine whether the file received in Step 150 comply with the composition rules.

Figure 3A:
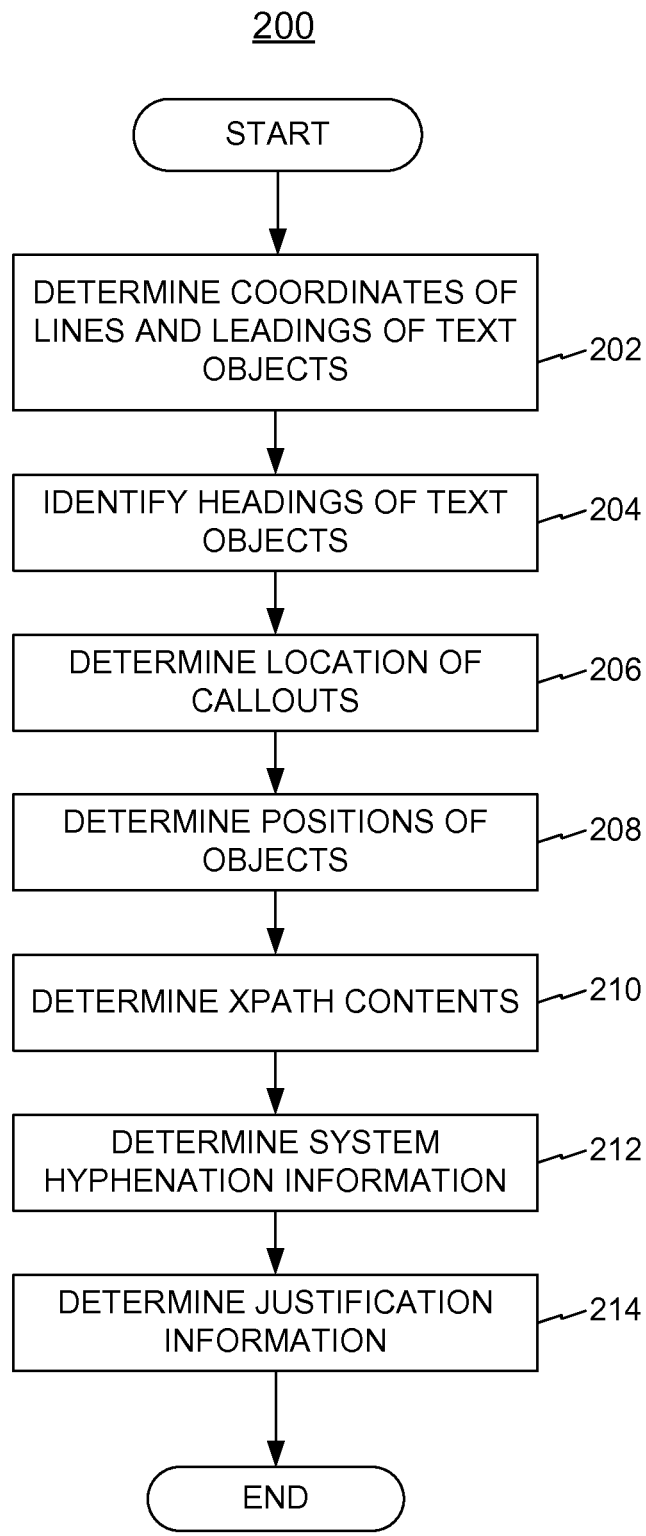
FIG. 3A is a flowchart of an exemplary file interpretation process consistent with certain disclosed embodiments.

FIG. 3A is a flowchart of an exemplary file interpretation process 200 consistent with certain disclosed embodiments. File interpretation process 200, as well as any or all of the individual steps therein, may be performed by any components of automated composition evaluation system 100, including reader 112, interpreter 114, evaluator 116, and processor 120. For exemplary purposes, FIG. 3A is disclosed as being performed by interpreter 114.

Automated composition evaluation system 100, via interpreter 114, may execute software instructions to determine one or more parameters of text objects (Process 200). The one or more parameters of text objects are sometimes also referred to as text parameters. A text object may comprise texts, such as characters, strings, lines, paragraphs, sections, columns, etc. Automated composition evaluation system 100 may also partition or separate, for example, lines or paragraphs of text into text objects. Thus, a line or a paragraph of text may correspond to one or more text objects. In some embodiments, automated composition evaluation system 100 may determine one or more parameters of text objects including all texts in the input document, or any portion of the texts in the input document, such as text within a paragraph or a column of a page.

Automated composition evaluation system 100, via interpreter 114, may determine the coordinates of the text lines in a text object (Step 202). The coordinates may be a 2-dimensional x, y coordinates. In one aspect, the coordinate information may be determined from the metrics file or from the input file received at Step 150. Automated composition evaluation system 100 may also determine leading information of text lines in a text object (Step 202). The leading information may include the distance between the baselines of successive lines of texts. For example, in Microsoft Word™ format, a leading is the line spacing or inter-line spacing, i.e., vertical line space between text lines. A leading may also include a font size. For example, 10-point text with 2 points of spacing between lines may correspond to a leading of 12 points. The leading information may also be determined from the metrics file or from the input file.

Automated composition evaluation system 100, via interpreter 114, may identify headings of text objects (Step 204). The formatting requirement of a heading may be different from that of the body text lines. For example, a heading may have a bigger font size, a wider leading tolerance, etc. Therefore, different formatting requirements may be imposed on headings and headings may be evaluated differently from other portions of the text lines. In some embodiments, different levels of headings may be identified in Step 204. For example, a document may have multiple levels of headings, summarizing the topics of the entire document, columns, sections, and paragraphs. Each of the multiple levels of headings may require a different format than the other levels. Automated composition evaluation system 100, via interpreter 114, may identify different levels of headings by using, for example, tags in the metrics files. Interpreter 114 may also identify the headings by any other means, such as by interpreting coordinates of text lines, text line positions in a document, text line spacing and relationship with other portion of the document.

Automated composition evaluation system 100, via interpreter 114, may determine locations of callouts (Step 206). A callout may include a string of text connected by a line, arrow, or similar graphic to a feature of an object, such as an illustration or a graphic, and give information about that feature. A callout may also include a string of text referring to an object that is associated with, but not necessarily connected with, the string of text. An object that a callout may connect or refer to includes a table, an equation, a graphic such as a schematic, a chart, a drawing, an image (referred to as "non-text object"), and any other desired object. A non-text object is an object that may or may not have text wrapping around it and may be a distance away from the corresponding callout. A non-text object may be placed below the text, above the text, or within the same layer of the text. A non-text object may also be connected with one or more callouts. For example, a callout in a Microsoft Word™ format may be a special text box with or without a small "tail" that may be pointed to different locations in a document. A non-text object may also be referred to, but not necessarily connected with, one or more of the corresponding callouts. For example, a callout may simply include a string such as "figure x," while figure x is a graphic object that is placed somewhere in the document. Automated composition evaluation system 100 may determine the locations of the callouts, including, for example, whether a non-text objects is placed before the associated callouts. Automated composition evaluation system 100 may also determine whether the callouts are correctly associated with a non-text object and whether there are any callouts that are not associated with any non-text object (i.e., orphaned callout).

Automated composition evaluation system 100, via interpreter 114, may determine positions of objects, including text objects, non-text objects, and any other objects in the metrics file (Step 208). Among other things, automated composition evaluation system 100 may determine positions of major and minor objects, float and anchored objects, and positions and/or orders of objects or sequenced objects. A major and a minor object may refer to the size of the object. For example, an object that has a width of a page may be referred to as a major object, while an object that has a width of a column may be referred to as a minor object. Major objects and minor objects may be anchored or float objects. An anchored object is fixed in position so that its position relative to some other object remains the same during repagination. For example, a graphic object may be anchored to a text object so that they always appear together. On the other hand, a float may change its position.

When automated composition evaluation system 100 determines the positions of the non-text objects, it may also determine the distance of the non-text objects to their associated callouts (the location of callout is determined in Step 206). For example, a non-text object, such as a float, may be placed several text lines or sometimes several pages away from its callout. Automated composition evaluation system 100 may thus determine the number of lines or pages between the callout and the corresponding float. In one aspect, some objects may be placed in a certain order. For example, a graphic object referred to as "FIG. 2" may not be placed after object "FIG. 1". Automated composition evaluation system 100 may determine, for example, the number of lines or pages between "FIG. 1" and "FIG. 2," and the relative positions of "FIG. 1" and "FIG. 2" objects.

Automated composition evaluation system 100, via interpreter 114, may also determine, for example, position of headings and footnotes (step not shown). In determining position of headings, automated composition evaluation system 100 may calculate the number of lines after an identified heading (e.g., from Step 204). Automated composition evaluation system 100 may also obtain indication of whether the different levels of headings are split. Moreover, automated composition evaluation system 100 may also determine whether a heading that is placed near the end of a column has a minimum required number of text lines after the heading. Automated composition evaluation system 100 may also determine positions of objects that are not described above, including any other types of positions desired.

Automated composition evaluation system 100, via interpreter 114, may determine XPath content (Step 210). A metrics file, such as an evaluable XML file, may include XPath content. XPath, i.e., XML Path Language, is a query language for selecting nodes from an XML document and for computing values (e.g., strings, numbers, or Boolean values) from the content of an XML document. An XPath expression may be evaluated with respect to a context node. As an example, XPath may include a type of expression referred as a location path. A location path consists of a sequence of location steps, and each location step may have three components, namely, an axis, a node test, and zero or more predicates. An axis has a specifier, such as "child" or "descendant", which specifies the direction to navigate from the context node. The node test and the predicates then further define which nodes are navigated. For example, a node test "A" requires that all nodes navigated to must have label "A." A predicate may further require that the selected nodes have certain properties. If the metrics file includes XPath content, automated composition evaluation system 100 may perform the evaluation process according to the XPath expressions. That is, the evaluator will perform the evaluation according to a pre-defined sequence.

In some embodiments, automated composition evaluation system 100 may perform the evaluation process based on the tags in the metrics file. For example, as shown in the illustrative metrics file, a metrics file may indicate a text object by including tags such as "<eval_line . . . />," automated composition evaluation system 100 may thus identify the object as a text object, determine the one or more parameters of the text object, and perform the evaluation process by comparing the one or more parameters to relevant composition rules of text objects.

Automated composition evaluation system 100, via interpreter 114, may determine system hyphenation information (Step 212). As an example, a system hyphenation may include a hyphen that breaks a word over two consecutive lines. In some embodiments, a system hyphenation may not be added or placed randomly within a word, but must be placed according to hyphenation rules. In some embodiments, for example, system hyphenation may not be placed at a non-acceptable syllable, and there may be no hyphenation within city names, etc. In step 212, automated composition evaluation system 100 may determine, for example, whether lines of a text object include a hyphen and obtain the relevant information associated with the hyphen, such as the number of consecutive hyphens, the breaking positions of the hyphens, and the text that contains the hyphens.

Automated composition evaluation system 100, via interpreter 114, may also determine justification information (Step 214). A justification is the typographic alignment setting of text or images within a column or a measure to align along the left and right margin of a column. As an example, if a column is aligned along both the left and right margins, it is referred to as "justified." In justified text, the spaces between words are stretched or sometimes compressed in order to make the text align with both the left and right margins. Automated composition evaluation system 100 may determine, for example, whether all text lines are justified, whether there is any loose justification (i.e., any lines that are not justified), and whether the justification is according to a pre-defined standard. For determining the justification information, automated composition evaluation system 100 may use, for example, coordination and leading information determined in Step 202.

One of ordinary skill in the art would appreciate that file interpretation process 200, as described corresponding to Steps 202-214, is for illustration only and is not exhaustive or limiting. Automated composition evaluation system 100, via interpreter 114, may determine or interpret information that are not described or included in steps 202-214. For example, automated composition evaluation system 100 may also determine white space information, label tag information, last-character-of-the-line information, subscript and superscript information, and any other information related to a text object. Automated composition evaluation system 100 may also perform some, but not all, steps that are included in Steps 202-214. Moreover, automated composition evaluation system 100 may also perform file interpretation process 200 notwithstanding the sequence as shown in FIG. 3A.

Figure 3B:
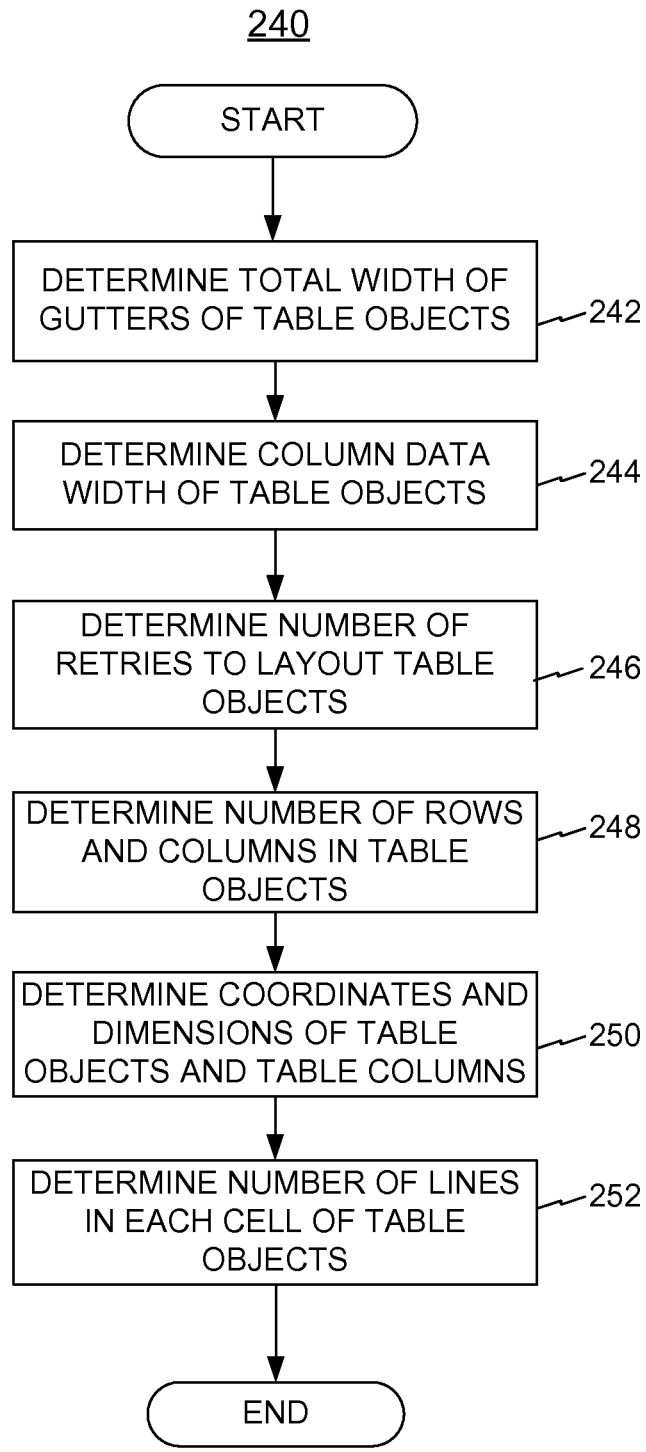
FIG. 3B is a flowchart of another exemplary file interpretation process consistent with certain disclosed embodiments.

FIG. 3B is a flowchart of another exemplary file interpretation process 240 consistent with certain disclosed embodiments. File interpretation process 240, as well as any or all of the individual steps therein, may be performed by any components of automated composition evaluation system 100, including reader 112, interpreter 114, evaluator 116, and processor 120. For exemplary purposes, FIG. 3B is disclosed as being performed by interpreter 114.

Automated composition evaluation system 100, via interpreter 114, may execute software instructions to determine one or more parameters of table objects. (Process 240). A table object may include data arranged in rows and columns. A spreadsheet, for example, is a table. A table may include text in the rows and columns.

Automated composition evaluation system 100, via interpreter 114, may determine a total width of gutters of table objects (Step 242). A table gutter is spacing between two adjacent cells, rows, or columns in a table. Automated composition evaluation system 100 may identify some or all gutters in a table, through, for example, the markup tags in the metrics file. After the table gutters are identified, automated composition evaluation system 100 may count the total number of table gutters and also returns the total width (or other desired dimensions) of the table gutters. Automated composition evaluation system 100 may further compare the total gutter width to the width of the table and determine, for example, a ratio of the gutter width to the table width.

Automated composition evaluation system 100, via interpreter 114, may determine whether any column of a table does not have content (Step not shown). That is, automated composition evaluation system 100 may search for an empty table column. If, for example, a particular column of a table is found to be empty, it may suggest that the column is not needed and thus may be removed.

Automated composition evaluation system 100, via interpreter 114, may determine column data width, or any parameter of the data, of a table object (Step 244). A column data width is the data width contained in a column of a table. For example, automated composition evaluation system 100 may determine that the data width in a certain column is either longer or shorter than the corresponding column width. And depending on the result, the width of the column or data, or both, may need to be adjusted so that the data is fit desirably into its corresponding column.

Automated composition evaluation system 100, via interpreter 114, may determine a number of retries to place a table object (Step 246). In some embodiments, the metrics file may include information indicating that a table object has been attempted to layout several times. This may occur, for example, because a table object has a width exceeding a width of a page, because a table object needs to be placed near its corresponding callout but there is a lack of space, or because of any other reasons that may prevent a table object to be laid out properly the first time. When a table object is not laid out properly the first time, there may be several subsequent attempts to lay it out properly. Automated composition evaluation system 100 may determine the number of lay out retries that have occurred. Moreover, automated composition evaluation system 100 may also determine a number of retries for each of the other non-text objects such as equation objects and graphic objects.

Automated composition evaluation system 100, via interpreter 114, may determine the number of rows and columns of a table object (Step 248), and coordinate information, such as x, y, coordinates, and dimension information of the table object and/or the columns of the table object (Step 250). For example, automated composition evaluation system 100 may determine a total number of rows and columns in a table object, width and height of each row and column of the table object, and positions of each table object.

Automated composition evaluation system 100, via interpreter 114, may determine a number of text lines in each cell of a table object (Step 252). Automated composition evaluation system 100 may also determine the number of white spaces in a table object (step not shown). Automated composition evaluation system 100 may also determine the layout of text lines in a cell, such as the font, justification, leading, heading, hyphenation, line breaks, alignments, etc. (step not shown).

One of ordinary skill in the art would appreciate that automated composition evaluation system 100, via interpreter 114, may determine parameters other than those described corresponding to FIGS. 3A and 3B. Automated composition evaluation system 100 may determine, in any sequence, any parameters related to text objects, table objects, graphic objects, equation objects, column, page, and the whole document. As an example, automated composition evaluation system 100 may also determine parameters of a text object including space between characters, space between words, variation of leadings between text blocks, white space that is at end of a line but not at end of a paragraph, and number of consecutive lines that are ended with either a physical hyphen or a discretionary hyphen. Automated composition evaluation system 100 may also determine whether a label tag is broken from the labeled item; whether certain special characters appear as the first or last character in a line; whether a system hyphen follows certain special characters, etc. The text objects as described here may include, for example, plain text, back matter text, and metadata. A plain text object may include body text of the input document. A back matter text object may include conclusions, appendix, glossary, index, etc. The metadata provides information about the underlying data (such as body text or other objects). For example, metadata may include means the data was created, the purpose of the data, time and date of the data creation, author of the data, etc.

As another example, automated composition evaluation system 100 may also determine the placement of various major, minor, anchored, or float objects. For example, automated composition evaluation system 100 may determine whether a major object is placed in order with other similar objects, whether an object callout in the Appendix is placed after the Appendix, etc.

As another example, automated composition evaluation system 100 may also determine parameters of a table object including the orientation of the table (such as whether it is rotated), whether an equation appears in a table, whether a table wraps to the next column or page without banking, etc. Moreover, automated composition evaluation system 100 may also determine parameters of an equation object including the dimensions of equations, whether the equation has multiple lines, whether an equation is overflowed, etc.

Furthermore, in some embodiments, automated composition evaluation system 100 may also determine parameters of a tag including whether certain types of tags are present. For example, automated composition evaluation system 100 may determine whether there is an overline tag, a monospace tag, a product tag, a multi-section table, a citation, etc.

Furthermore, in some embodiments, automated composition evaluation system 100 may also determine relationship among the objects. For example, automated composition evaluation system 100 may determine that a certain text object, table object, equation object, or graphic object may be located within a single column or page, or may be located across multiple columns or pages. In addition, automated composition evaluation system 100 may also determine that a table object needs to be placed near a callout, or another table object, a related equation object, or a related graphic object.

One of ordinary skill in the art would appreciate that file interpretation process 240, as described corresponding to Steps 242-252, are for illustration only and not exhaustive or limiting. Automated composition evaluation system 100, via interpreter 114, may determine or interpret information that are not described or included in Steps 242-252, some of them are discussed above. Automated composition evaluation system 100 may also perform some, but not all, steps that are included in Steps 242-252. Moreover, automated composition evaluation system 100 may also perform file interpretation process 240 notwithstanding the sequence as shown in FIG. 3B.

Figure 4:
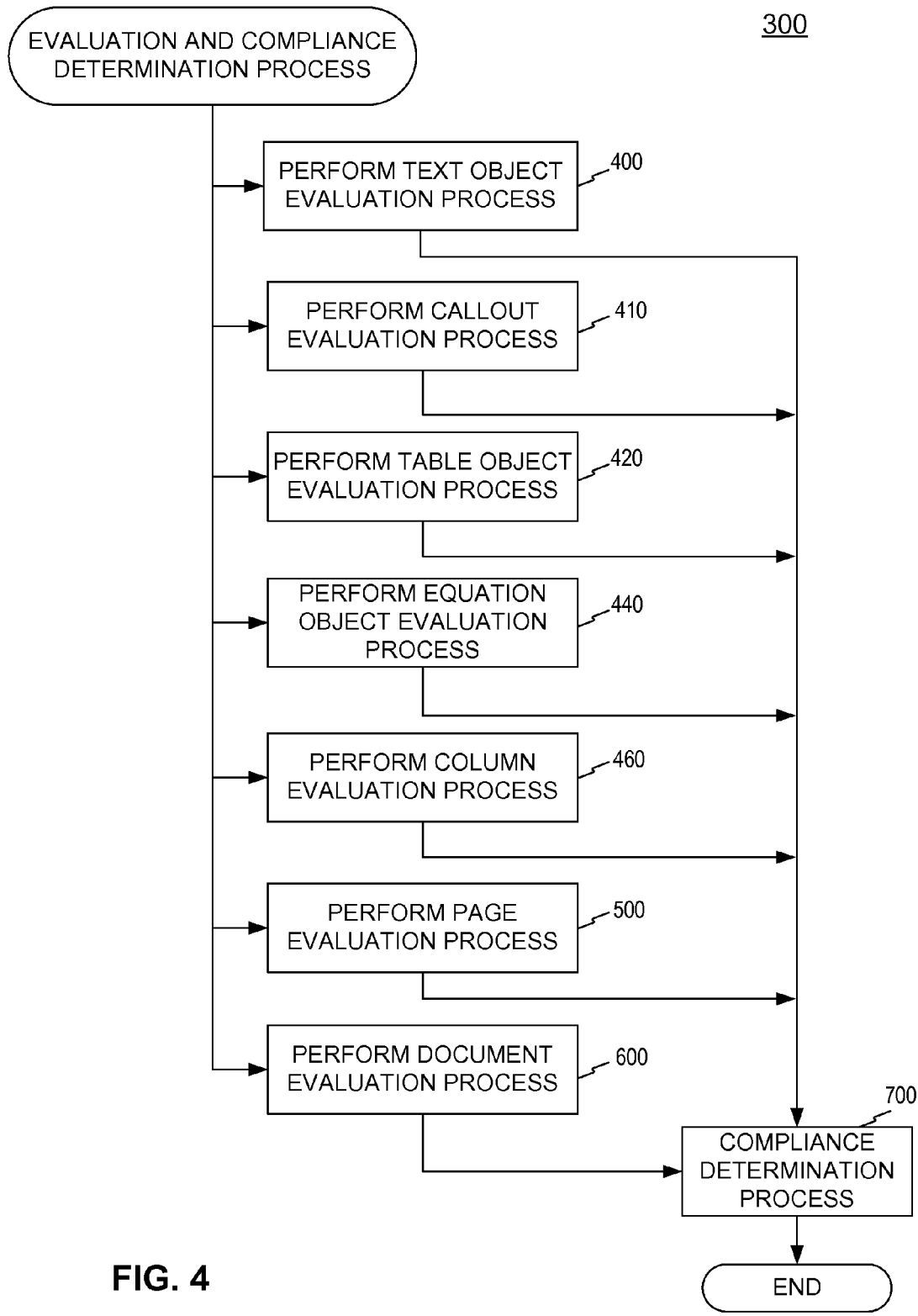
FIG. 4 is a flowchart of an exemplary evaluation and compliance determination process consistent with certain disclosed embodiments.

FIG. 4 is a flowchart of an exemplary evaluation and compliance determination process 300 consistent with certain disclosed embodiments. Evaluation and compliance determination process 300, as well as any or all of the individual steps therein, may be performed by any components of automated composition evaluation system 100, including reader 112, interpreter 114, evaluator 116, rule engine 122 and processor(s) 120. For exemplary purposes, FIG. 4 is disclosed as being performed by evaluator 116 and rule engine 122.

Automated composition evaluation system 100, via evaluator 116 and rule engine 122, may execute software instructions to perform a text object evaluation process (Step 400), a callout evaluation process (Step 410), a table object evaluation process (Step 420), an equation object evaluation process (Step 440), and a column evaluation process (Step 460). Steps 400, 410, 420, 440, and 460 are described in detail corresponding to FIGS. 5A-5E. In brief, automated composition evaluation system 100 may perform evaluation processes 400, 410, 420, 440, and 460 to obtain one or more findings based on a plurality of corresponding composition rules.

Automated composition evaluation system 100, via evaluator 116 and rule engine 122, may also execute software instructions to perform a page evaluation process (Step 500) and a document evaluation process (Step 600). Steps 500 and 600 are described in detail corresponding to FIGS. 6-7. In brief, automated composition evaluation system 100 may perform evaluation processes 500 and 600 to obtain one or more findings based on a plurality of corresponding composition rules.

One of ordinary skill in the art would appreciate that evaluation processes 400, 410, 420, 440, 460, 500, and 600 are for illustration only and not exhaustive or limiting. Automated composition evaluation system 100 may perform any other desired evaluation process. For example, automated composition evaluation system 100 may also perform evaluation process of any other object included in the metrics file. In addition, automated composition evaluation system 100 may also perform some, but not all, Steps 400, 410, 420, 440, 460, 500, and 600. Moreover, automated composition evaluation system 100 may also perform Steps 400, 410, 420, 440, 460, 500, and 600 notwithstanding the sequence as shown in FIG. 4. For example, automated composition evaluation system 100 may perform table object evaluation process of Step 420 before it performs text object evaluation process 400.

Furthermore, it is not necessary to perform one or more of Steps 400, 410, 420, 440, and 460 before performing the page evaluation process of Step 500 and the document evaluation process of Step 600. As an example, automated composition evaluation system 100 may evaluate all the text and non-text objects in a certain page and then perform the evaluation process of that page by taking into account the findings of evaluating the text and non-text objects of that page. Automated composition evaluation system 100 may also evaluate the page first without evaluating the text and non-text objects of that page. As another example, automated composition evaluation system 100 may evaluate all the text and non-text objects in the whole input document and then perform page evaluation process for each of the pages in the input document. In other words, all steps of process 300 as shown in FIG. 4 may be performed in any order that is desired.

Figure 5A:
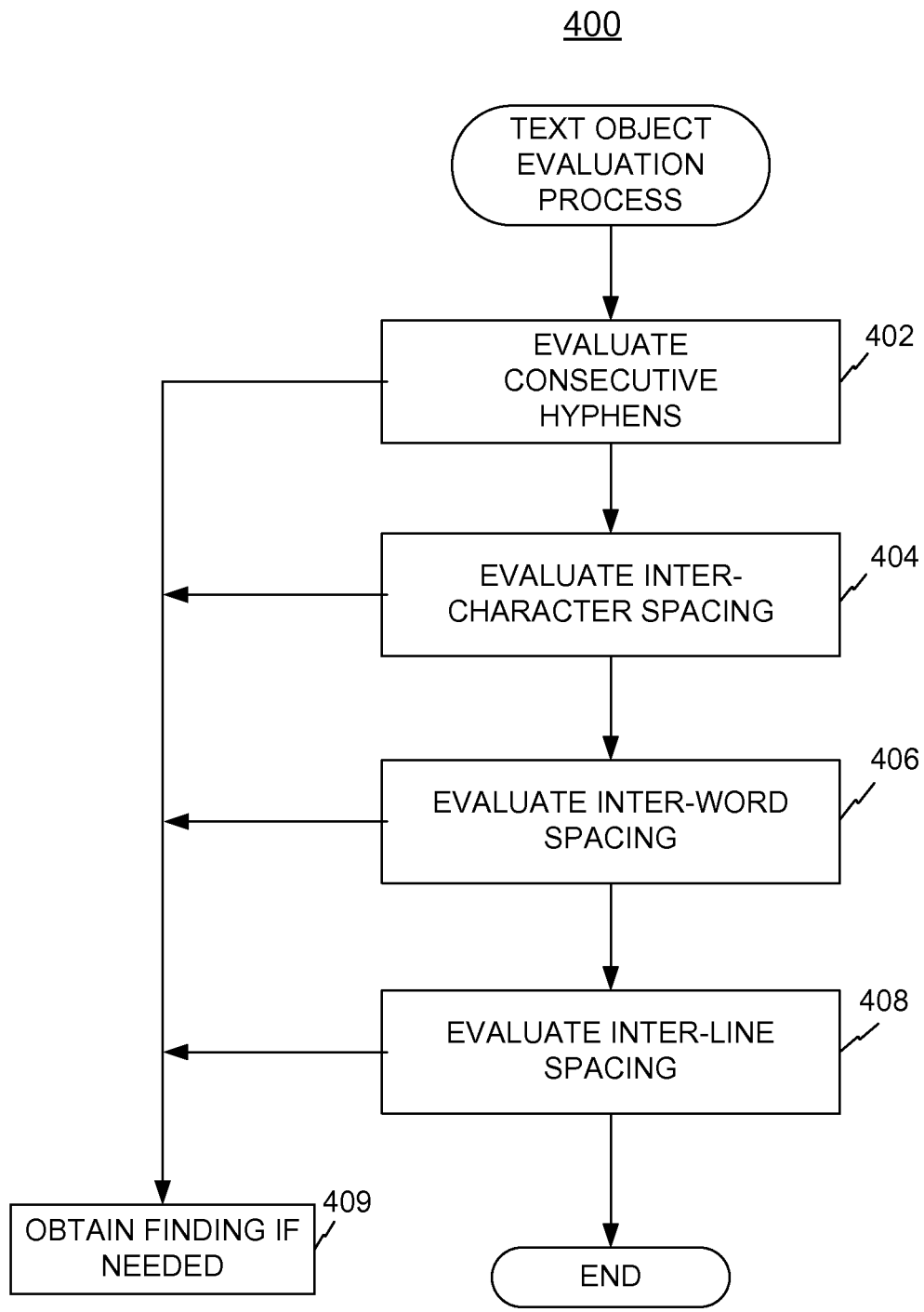
FIG. 5A is a flowchart of an exemplary text object evaluation process consistent with certain disclosed embodiments.

FIG. 5A is a flowchart of an exemplary text object evaluation process 400 consistent with certain disclosed embodiments. Text object evaluation process 400, as well as any or all of the individual steps therein, may be performed by any components of automated composition evaluation system 100, including evaluator 116, rule engine 122 and processor 120. For exemplary purposes, FIG. 5A is disclosed as being performed by evaluator 116 and rule engine 122.

Automated composition evaluation system 100, via evaluator 116 and rule engine 122, may execute software instructions to evaluate consecutive hyphens (Step 402), such as to determine whether the number of consecutive hyphens of a text object satisfies a first text-threshold condition. For example, automated composition evaluation system 100 may determine that if there are more than 4 consecutive hyphens in a text object, such as a paragraph or a text block that is being evaluated, a finding may be generated, recorded, and/or stored (Step 409). A finding may be any numerical or textual data indicating the result of evaluation process. For example, a finding may be textual strings such as "fail," "warning," and "information only." Thus, if automated composition evaluation system 100 determines that there are less than 4 consecutive hyphens, it may generate and record a finding as "information only." If, however, automated composition evaluation system 100 determines that there are more than 4 consecutive hyphens, it may generate and record a finding as "warning." A finding may also be a numerical value such as a score or points indicating the result of evaluating. For example, if automated composition evaluation system 100 determines that there are less than 4 consecutive hyphens, it may deduct no points or a small number of points (such as 20 point out of total of 100 points) from an initial score (such as 100 points), and store the score in a storage device, such as memory 124.

Automated composition evaluation system 100, via evaluator 116 and rule engine 122, may execute software instructions to evaluate inter-character spacing (Step 404), such as to determine whether inter-character spacing in the text object satisfies a second text-threshold condition. As an example, automated composition evaluation system 100 may determine whether the inter-character spacing is greater than a maximum allowed value defined in the composition rule, such as 2.1 mm, or less than a minimum allowed value defined in the composition rule, such as 0 mm, and generate, record, and/or store a corresponding finding (Step 409). If automated composition evaluation system 100 determines that the inter-character spacing is in compliance with the composition rules, automated composition evaluation system 100 may proceed to the next step.

Automated composition evaluation system 100, via evaluator 116 and rule engine 122, may execute software instructions to evaluate inter-word spacing (Step 406), such as to determine whether inter-word spacing in the text object satisfies a third text-threshold condition. As an example, if automated composition evaluation system 100 determines that the inter-word spacing is greater than a maximum allowed value defined in the composition rule, such as 4 mm, or less than a minimum allowed value defined in the composition rule, such as 0.5 mm, it may generate, record, and/or store a finding correspondingly (Step 409). If the evaluator determines that the inter-word spacing is in compliance with the composition rules, automated composition evaluation system 100 may proceeds to the next step.

Automated composition evaluation system 100, via evaluator 116 and rule engine 122, may execute software instructions to evaluate inter-line spacing (Step 408), such as to determine whether inter-line spacing in the text object satisfies a fourth text-threshold condition. As an example, if automated composition evaluation system 100 determines that the inter-line spacing is greater than a maximum allowed value defined in the composition rule, such as 10 mm, or less than a minimum allowed value defined in the composition rule, such as 0 mm, it may generate, record, and/or store a corresponding finding (Step 409). If automated composition evaluation system 100 determines that the inter-line spacing is in compliance with the composition rules, it may proceed to the next step to evaluate other parameters included in the metrics file based on the composition rules, or may proceed to an end of process 400.

Although the above examples illustrate that each of the text-threshold conditions is a single value, a text-threshold condition defined in the composition rule may also have more than one single numerical value. As an example, depending on the whether the lines are body text lines or headings, the text-threshold condition for inter-line spacing may have more than one values. For example, inter-line spacing threshold for spacing between a level-1 heading to a body line may have a maximum of 10 mm and minimum of 5 mm, while inter-line spacing threshold for spacing between a body line to a body line may have a maximum of 5.3 mm and minimum of 0 mm. In addition, an evaluation step may also generate more than one finding, such as findings in more than one aspects of the same object being evaluated.

One of ordinary skill in the art would appreciate that Steps 402, 404, 406, and 408 of text object evaluation processes 400 are for illustration only and not exhaustive or limiting. Automated composition evaluation system 100 may perform any other desired evaluation steps. For example, automated composition evaluation system 100 may also perform evaluation process of any other parameters included in the metrics file. In addition, automated composition evaluation system 100 may also perform some, but not all, Steps 402, 404, 406, and 408 of text object evaluation processes 400. Moreover, automated composition evaluation system 100 may also perform Steps 402, 404, 406, and 408 of text object evaluation processes 400 notwithstanding the sequence as shown in FIG. 4A. For example, automated composition evaluation system 100 may perform Step 408 before it performs Step 402.

Figure 5B:
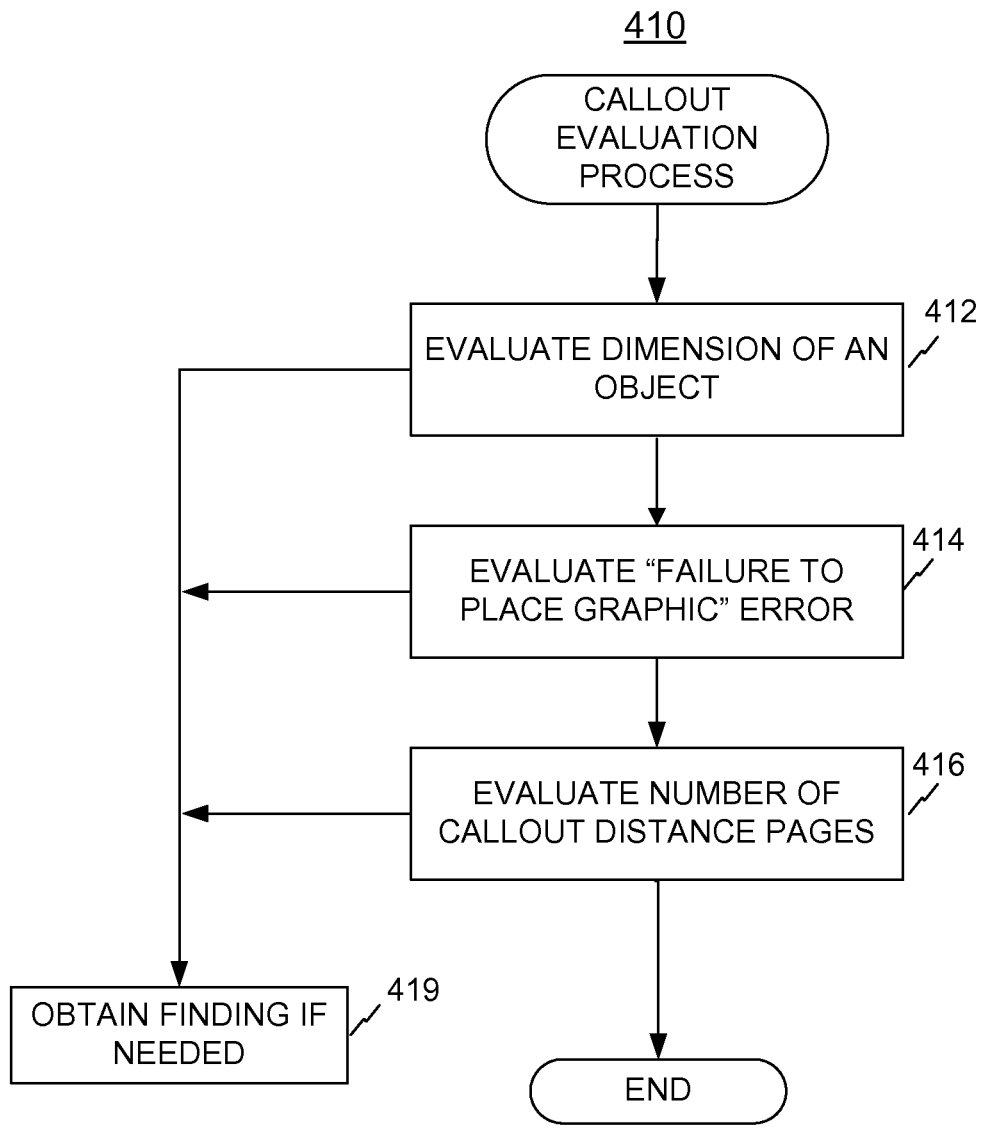
FIG. 5B is a flowchart of an exemplary callout evaluation process consistent with certain disclosed embodiments.

FIG. 5B is a flowchart of an exemplary callout evaluation process 410 consistent with certain disclosed embodiments. Callout evaluation process 410, as well as any or all of the individual steps therein, may be performed by any components of automated composition evaluation system 100, including evaluator 116, rule engine 122 and processor 120. For exemplary purposes, FIG. 5B is disclosed as being performed by evaluator 116 and rule engine 122.

Automated composition evaluation system 100, via evaluator 116 and rule engine 122, may execute software instructions to evaluate the dimension of an object (Step 412), such as to determine whether a dimension, such as a length, of one or more objects, such as a table object, an equation object, and a graphic object, satisfies a first callout-threshold condition. For example, if the length of the object is greater than the length of the page containing the object, automated composition evaluation system 100 may generate, record, and/or store a corresponding finding (Step 419). If automated composition evaluation system 100 determines that the length of the object is less than or equal to the length of the page, it may proceed to the next step. The one or more objects may be associated with one or more callouts.

Automated composition evaluation system 100, via evaluator 116 and rule engine 122, may execute software instructions to evaluate the "failure to place graphic" error (Step 414), such as to determine whether the one or more objects, such as the table object, the equation object, and the graphic object, cannot be placed. For example, automated composition evaluation system 100 may determine whether a "failure to place graphic" error code exists. As discussed in Step 246 shown in FIG. 3B, in some embodiments, the metrics file may include information indicating an object, such as a table object, an equation object, and a graphic object, has been attempted to be laid out several times. This may occur, for example, because the object has a width/length exceeding a width/length of a page; the object needs to be placed near its corresponding callout but there is a lack of space; a placing mechanism may not load a required graphic object that was referenced by the input document; an equation object is broken or was not generated properly; a placing mechanism may not generate a back-order-item because the element referenced by an ID may not be found; the end of the input document has been reached before the object may be placed; or because of any other reason that may prevent the object to be placed properly the first time.

When the object is not placed properly the first time, there may be several subsequent retries to lay it out properly. Automated composition evaluation system 100 may determine the number of retries that have occurred. When the object has been attempted to be placed for a pre-defined number of retires, but still cannot be placed, a "failure to place graphic" code may be generated and included in the metrics file. Automated composition evaluation system 100 may thus determine whether a "failure to place graphic" error code exists. If such error code exists, automated composition evaluation system 100 may generate, record, and/or store a corresponding finding (Step 419). If automated composition evaluation system 100 determines that no such error code, or any other error code, exists, it may proceed to the next step.

Automated composition evaluation system 100, via evaluator 116 and rule engine 122, may execute software instructions to evaluate number of callout distance pages (Steps 416), such as to determine whether a distance between a callout and its associated object satisfies one or more callout-threshold conditions. As discussed above, an object may be located several text lines or several pages away from its callout. If automated composition evaluation system 100 determines the number of lines or pages is greater than a second callout-threshold condition, it may generate, record, and/or store a corresponding finding (Step 419). Similarly, if automated composition evaluation system 100 determines the number of lines or pages is less than a third callout-threshold condition, it may generate, record, and/or store a corresponding finding (Step 419). If automated composition evaluation system 100 determines that the distance between the callout and its associated object is within an acceptable range defined in the composition rule, it may proceed to the next step to evaluate other parameters included in the metrics file based on the composition rules, or may proceed to an end of process 410.

One of ordinary skill in the art would appreciate that Steps 412, 414, 416, and 418 of callout evaluation processes 410 are for illustration only and not exhaustive or limiting. Automated composition evaluation system 100 may perform any other desired evaluation steps. For example, automated composition evaluation system 100 may also perform evaluation process of any other parameters included in the metrics file, such as those described corresponding to FIGS. 3A and 3B. In addition, automated composition evaluation system 100 may also perform some, but not all, Steps 412, 414, and 416 of callout evaluation processes 410. Moreover, automated composition evaluation system 100 may also perform Steps 412, 414, and 416 of callout evaluation processes 410 notwithstanding the sequence as shown in FIG. 5B. For example, automated composition evaluation system 100 may perform Step 416 before it performs Step 412.

Figure 5C:
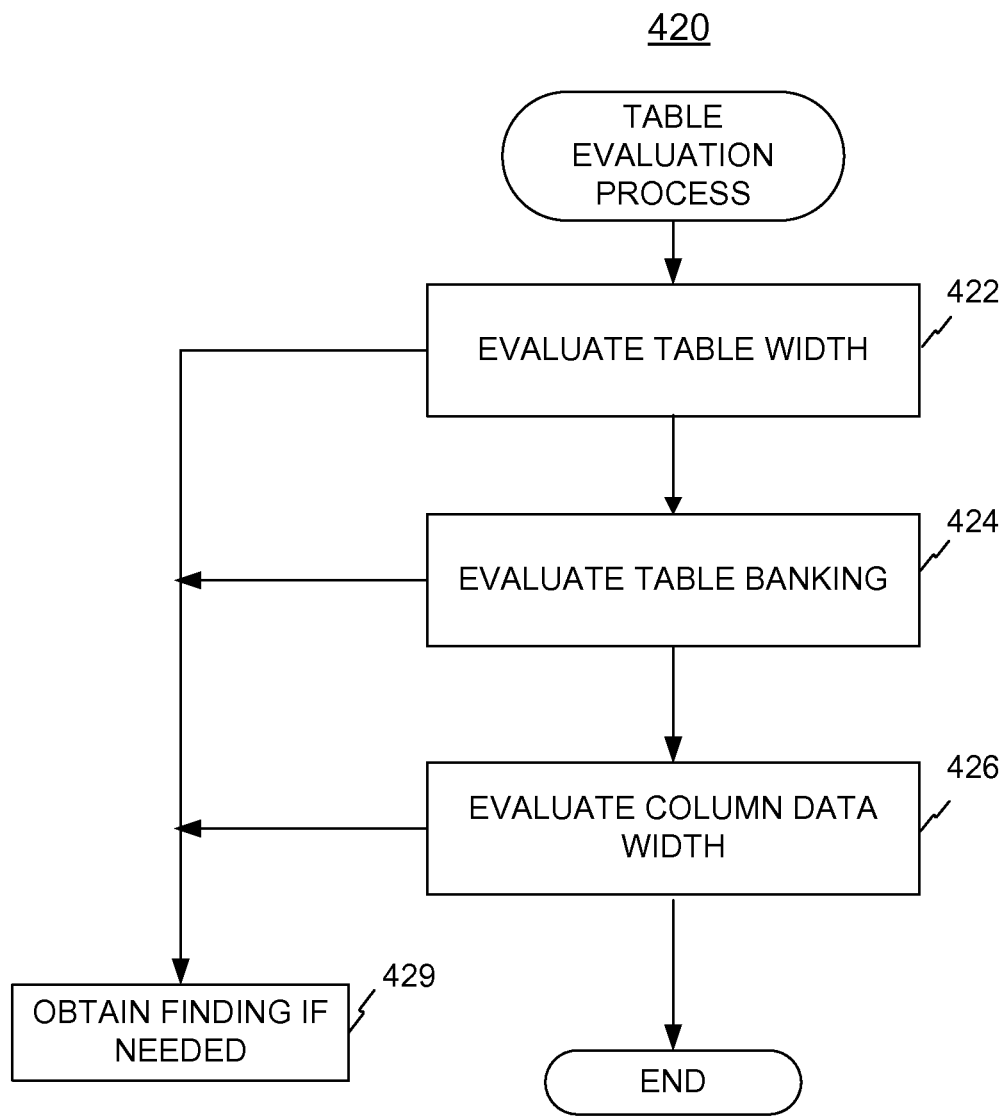
FIG. 5C is a flowchart of an exemplary table evaluation process consistent with certain disclosed embodiments.

FIG. 5C is a flowchart of an exemplary table evaluation process 420 consistent with certain disclosed embodiments. Table evaluation process 420, as well as any or all of the individual steps therein, may be performed by any components of automated composition evaluation system 100, including evaluator 116, rule engine 122 and processor 120. For exemplary purposes, FIG. 5C is disclosed as being performed by evaluator 116 and rule engine 122.

Automated composition evaluation system 100, via evaluator 116 and rule engine 122, may execute software instructions to evaluate table width (Step 422), such as to determine whether a dimension, such as a table width, of a table object, satisfies a first table-threshold condition. For example, if the width of the table object is greater than the width of the page containing the table object, automated composition evaluation system 100 may generate, record, and/or store a corresponding finding (Step 429). If automated composition evaluation system 100 determines that the width of the table object is less than or equal to the width of the page, it may proceed to the next step.

Automated composition evaluation system 100, via evaluator 116 and rule engine 122, may execute software instructions to evaluate table banking (Step 424), such as to determine whether the table object is banked. A table object may sometimes include more rows than columns, or vice versa. For example, a table object may have 10 rows, but 2 columns. The shape, or layout, of the table object, may therefore be long in its vertical dimension and short in its horizontal dimension. A long table object may not be desirable or may not be placed properly in the document. Therefore, a table object may be banked by, for example, separating some of the rows and placing the separated rows to the side of the unseparated rows. As an example, a table object having 10 rows by 2 columns may be banked such that it has 5 rows by 4 columns. A banked table may therefore be placed properly in the document. Automated composition evaluation system 100 may thus determine whether a table is banked. If, for example, the table is not banked and is not placed properly or desirably, automated composition evaluation system 100 may generate, record, and/or store a corresponding finding (Step 429). Automated composition evaluation system 100 may also attempt to bank the table for proper placement. If automated composition evaluation system 100 determines that the table object is banked and/or is placed properly or desirably, it may proceed to the next step.

Automated composition evaluation system 100, via evaluator 116 and rule engine 122, may execute software instructions to evaluate column data width (Steps 426), such as to determine whether a column data width satisfies a second table-threshold condition and/or a third table-threshold condition. As discussed above, a column data width is the data width contained in a column of a table object. For example, automated composition evaluation system 100 may determine that the data width in a certain column is either longer or shorter than the corresponding column width. And depending on the result, one or both of the width of the column and the column data may need to be adjusted so that the column data may fit desirably into its corresponding column. Moreover, a column data may span across multiple columns in a table object. But the column data width may not be more than the width of the entire table or the width of the page containing the table. Therefore, if automated composition evaluation system 100 determines that the column data width is greater than a second table-threshold condition, such as a width of the entire table, and/or greater than a third table-threshold condition, such as a width of the page, it may generate, record, and/or store a corresponding finding (Step 429). If automated composition evaluation system 100 determines that the column data width is within an acceptable range defined in the composition rule, it may proceed to the next step to evaluate other parameters included in the metrics file based on the composition rules, or may proceed to an end of process 420.

One of ordinary skill in the art would appreciate that Steps 422, 424, and 426 of table evaluation processes 420 are for illustration only and not exhaustive or limiting. Automated composition evaluation system 100 may perform any other desired evaluation steps. For example, automated composition evaluation system 100 may also perform evaluation process of any other parameters included in the metrics file, such as those described corresponding to FIGS. 3A and 3B. In addition, automated composition evaluation system 100 may also perform some, but not all, Steps 422, 422, and 426 of table evaluation processes 420. Moreover, automated composition evaluation system 100 may also perform Steps 422, 422, and 426 of table evaluation processes 420 notwithstanding the sequence as shown in FIG. 5C. For example, automated composition evaluation system 100 may perform Step 424 before it performs Step 422.

Figure 5D:
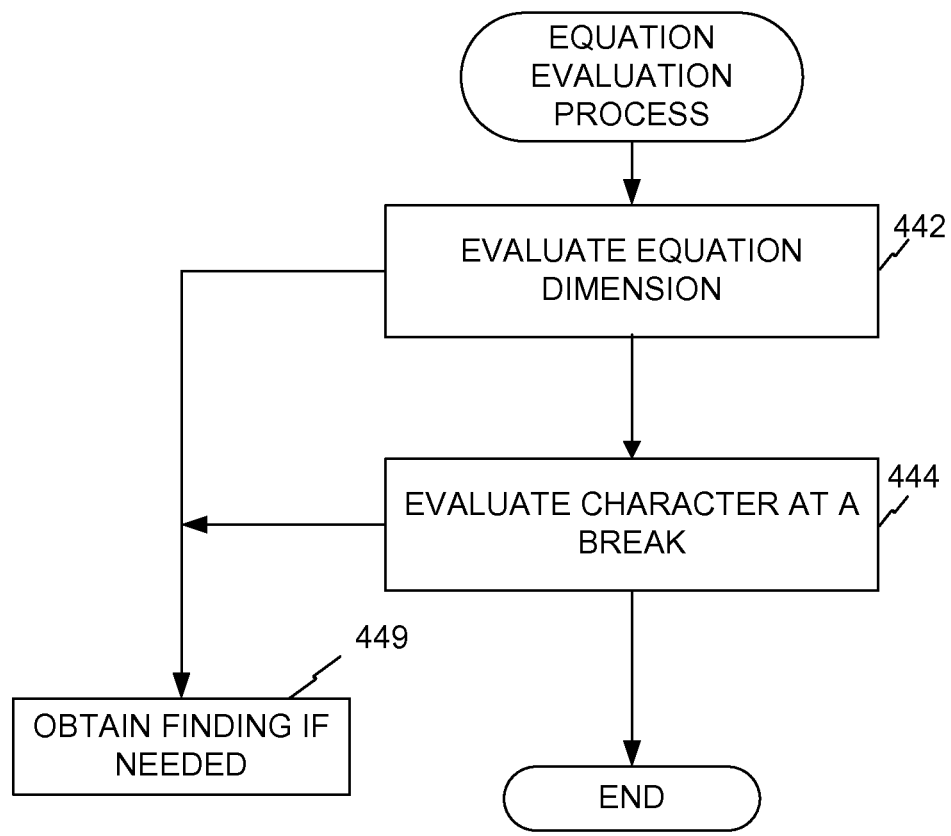
FIG. 5D is a flowchart of an exemplary equation evaluation process consistent with certain disclosed embodiments.

FIG. 5D is a flowchart of an exemplary equation evaluation process 440 consistent with certain disclosed embodiments. Equation evaluation process 440, as well as any or all of the individual steps therein, may be performed by any components of automated composition evaluation system 100, including evaluator 116, rule engine 122 and processor 120. For exemplary purposes, FIG. 5D is disclosed as being performed by evaluator 116 and rule engine 122.

Automated composition evaluation system 100, via evaluator 116 and rule engine 122, may execute software instructions to evaluate equation dimension (Step 442), such as to determine whether a dimension, such as an equation width, of an equation object, satisfies a first equation-threshold condition. For example, if the width of the equation object is greater than the width of the page containing the equation object, automated composition evaluation system 100 may generate, record, and/or store a corresponding finding (Step 449). If automated composition evaluation system 100 determines that the width of the equation object is less than or equal to the width of the page, it may proceed to the next step.

Automated composition evaluation system 100, via evaluator 116 and rule engine 122, may execute software instructions to evaluate character at a break (Step 444), such as to determine whether a character at a line-break satisfies a second equation-threshold condition. A line-break breaks a line to the next line. An equation object may include multiple lines and thus may need to break at certain points. Break points in an equation object, however, may not be placed at any position. For example, the break points may not be placed in the middle of an array, or at a root or script. Therefore, if automated composition evaluation system 100 determines the character(s) at the break points of an equation object constitute an improper line-break, it may generate, record, and/or store a corresponding finding (Step 449). Otherwise, it may proceed to the next step to evaluate other parameters included in the metrics file based on the composition rules, or may proceed to an end of process 440.

One of ordinary skill in the art would appreciate that Steps 442 and 444 of equation evaluation processes 440 are for illustration only and not exhaustive or limiting. Automated composition evaluation system 100 may perform any other desired evaluation steps. For example, automated composition evaluation system 100 may also perform evaluation process of any other parameters included in the metrics file, such as those described corresponding to FIGS. 3A and 3B. In addition, automated composition evaluation system 100 may also perform some, but not both, Steps 442 and 444 of equation evaluation processes 440. Moreover, automated composition evaluation system 100 may also perform Steps 442 and 444 of equation evaluation processes 440 notwithstanding the sequence as shown in FIG. 5D. For example, automated composition evaluation system 100 may perform Step 444 before it performs Step 442.

Figure 5E:
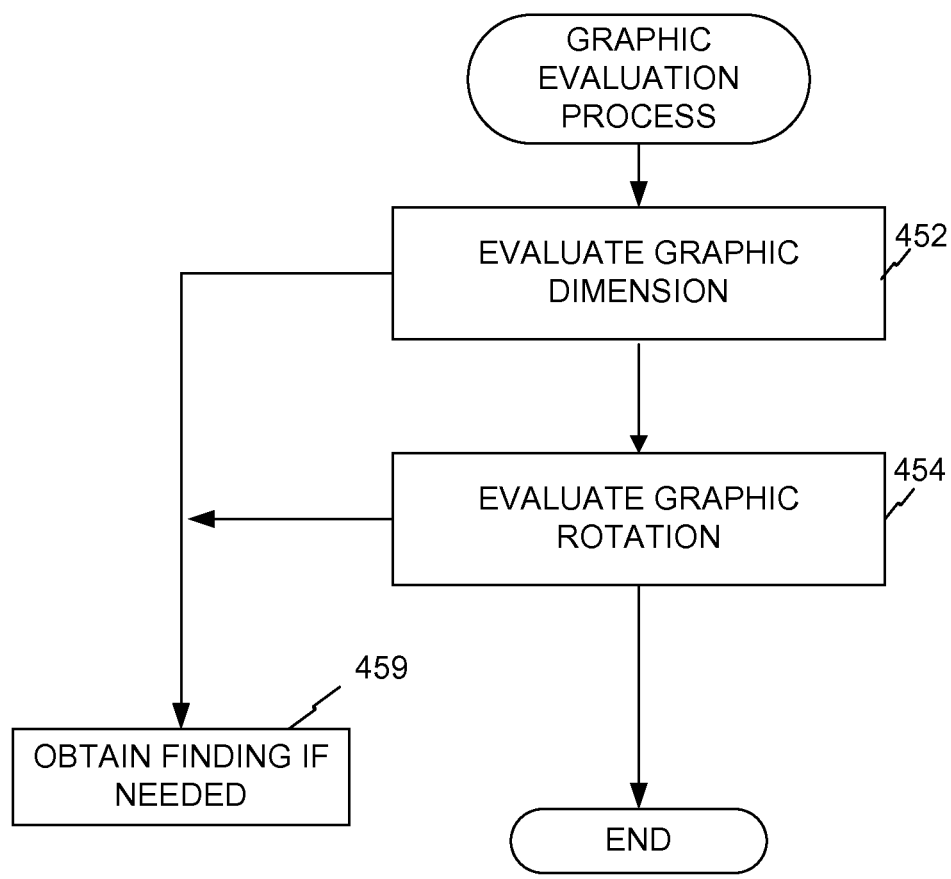
FIG. 5E is a flowchart of an exemplary graphic evaluation process consistent with certain disclosed embodiments.

FIG. 5E is a flowchart of an exemplary graphic evaluation process 450 consistent with certain disclosed embodiments. Graphic evaluation process 450, as well as any or all of the individual steps therein, may be performed by any components of automated composition evaluation system 100, including evaluator 116, rule engine 122 and processor 120. For exemplary purposes, FIG. 5E is disclosed as being performed by evaluator 116 and rule engine 122.

Automated composition evaluation system 100, via evaluator 116 and rule engine 122, may execute software instructions to evaluate graphic dimension (Step 452), such as to determine whether a dimension, such as a graphic width, of a graphic object, satisfies a first graphic-threshold condition. For example, if the width of the graphic object is greater than the width of the page containing the graphic object, automated composition evaluation system 100 may generate, record, and/or store a corresponding finding (Step 445). If automated composition evaluation system 100 determines that the width of the graphic object is less than or equal to the width of the page, it may proceed to the next step.

Automated composition evaluation system 100, via evaluator 116 and rule engine 122, may execute software instructions to evaluate graphic rotation (Steps 454), such as to determine whether a graphic object, such as a chart, an image, a curve, etc., is rotated, the direction of rotation, and the degree of rotation. A graphic object may be rotated to be placed, but the orientation of the graphic object may be affected. Therefore, if automated composition evaluation system 100 determines the graphic object is rotated, it may generate, record, and/or store a corresponding finding (Step 459). Otherwise, it may proceed to the next step to evaluate other parameters included in the metrics file based on the composition rules, or may proceed to an end of process 450.

One of ordinary skill in the art would appreciate that Steps 452 and 454 of graphic evaluation processes 450 are for illustration only and not exhaustive or limiting. Automated composition evaluation system 100 may perform any other desired evaluation steps. For example, automated composition evaluation system 100 may also perform evaluation process of any other parameters included in the metrics file, such as those described corresponding to FIGS. 3A and 3B. In addition, automated composition evaluation system 100 may also perform some, but not all, Steps 452 and 454 of equation evaluation processes 450. Moreover, automated composition evaluation system 100 may also perform Steps 452 and 454 of graphic evaluation processes 450 notwithstanding the sequence as shown in FIG. 5E. For example, automated composition evaluation system 100 may perform Step 454 before it performs Step 452.

Figure 5F:
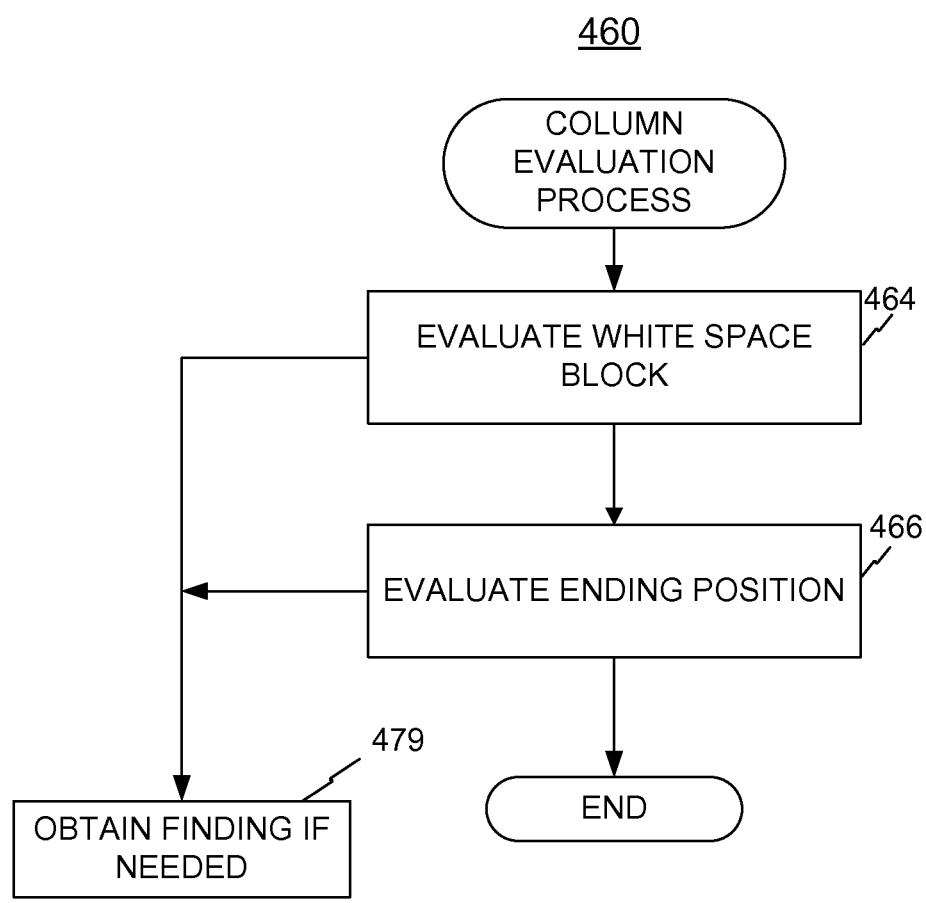
FIG. 5F is a flowchart of an exemplary column evaluation process consistent with certain disclosed embodiments.

FIG. 5F is a flowchart of an exemplary column evaluation process 460 consistent with certain disclosed embodiments. In a document, a column may be a vertical area reserved for text objects. For example, a scientific article may separate a page into two vertical areas, or columns. A column, however, may also include other objects such as table, equation, and graphic objects. Column evaluation process 460, as well as any or all of the individual steps therein, may be performed by any components of automated composition evaluation system 100, including evaluator 116, rule engine 122 and processor 120. For exemplary purposes, FIG. 5F is disclosed as being performed by evaluator 116 and rule engine 122.

Automated composition evaluation system 100, via evaluator 116 and rule engine 122, may execute software instructions to evaluate white space block(s) (Step 464), such as to determine whether a white space block satisfies a first column-threshold condition. A white space may refer to all characters that appear as blanks on a display screen or printer. A white space may include the space character, the tab character, and sometimes other special characters that do not have a visual form (for example, the bell character and null character). If, for example, automated composition evaluation system 100 determines that a white space block at the end of an column object is greater than a first column-threshold condition defined in the composition rule, such as 22 points, automated composition evaluation system 100 may generate, record, and/or store a corresponding finding (Step 479). If automated composition evaluation system 100 determines that the white space block is less than or equal to the first column-threshold condition, it may proceed to the next step.

Automated composition evaluation system 100, via evaluator 116 and rule engine 122, may execute software instructions to evaluate ending position(s) (Step 466), such as to determine whether an ending position of the column satisfies a second column-threshold condition and a third column-threshold condition. Ending positions of columns may be required to be within certain range so that columns on a page or multiple pages are balanced. Columns on the last page may not need to be balanced as the other pages. If automated composition evaluation system 100 determines that the ending position of a column object is greater than a second column-threshold condition or less than a third column-threshold condition, it may generate, record, and/or store a corresponding finding (Step 479). If automated composition evaluation system 100 determines that the ending position of the column object is within an acceptable range defined in the composition rule, it may proceed to the next step to evaluate other parameters included in the metrics file based on the composition rules, or may proceed to an end of process 460.

One of ordinary skill in the art would appreciate that Steps 464 and 466 of column evaluation processes 460 are for illustration only and not exhaustive or limiting. Automated composition evaluation system 100 may perform any other desired evaluation steps. For example, automated composition evaluation system 100 may also perform evaluation process of any other parameters included in the metrics file, such as those described corresponding to FIGS. 3A and 3B. In addition, automated composition evaluation system 100 may also perform some, but not all, Steps 464 and 466 of table evaluation processes 460. Moreover, automated composition evaluation system 100 may also perform Steps 464 and 466 of column evaluation processes 460 notwithstanding the sequence as shown in FIG. 5F. For example, automated composition evaluation system 100 may perform Step 466 before it performs Step 464.

Figure 6:
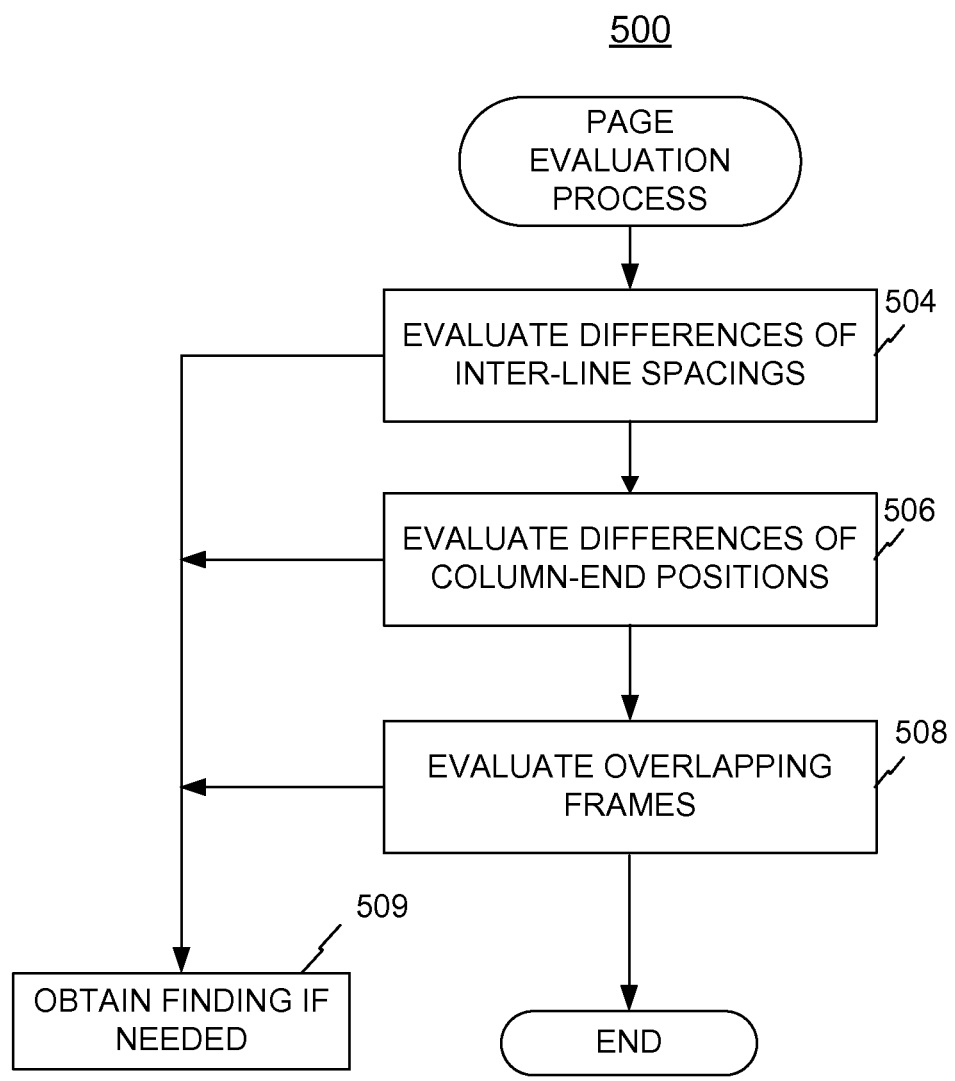
FIG. 6 is a flowchart of an exemplary page evaluation process consistent with certain disclosed embodiments.

FIG. 6 is a flowchart of an exemplary page evaluation process 500 consistent with certain disclosed embodiments. Page evaluation process 500, as well as any or all of the individual steps therein, may be performed by any components of automated composition evaluation system 100, including evaluator 116, rule engine 122 and processor 120. For exemplary purposes, FIG. 6 is disclosed as being performed by evaluator 116 and rule engine 122.

Automated composition evaluation system 100, via evaluator 116 and rule engine 122, may execute software instructions to evaluate differences of inter-line spacing (Step 504), such as to determine whether differences of inter-line spacing of text objects in the page satisfy a first and a second page-threshold conditions. As discussed above corresponding to FIG. 5A, automated composition evaluation system 100 determines whether inter-line spacing within a certain text object satisfy the corresponding threshold conditions. In Step 504, automated composition evaluation system 100 may determine whether differences of inter-line spacing between the text objects satisfy a first page-threshold condition. The first page-threshold condition can be, for example, a single minimum or maximum value, both minimum and maximum value, or a range of values. The first page-threshold condition is defined in the composition rule. If the differences are outside of an accepted range, automated composition evaluation system 100 may generate, record, and/or store a corresponding finding (Step 509). If automated composition evaluation system 100 determines that the differences are inside of the accepted range, it may proceed to the next step.

Automated composition evaluation system 100, via evaluator 116 and rule engine 122, may execute software instructions to evaluate difference of column-end positions (Step 506), such as to determine whether differences of ending positions of columns satisfies a second page-threshold conditions. The second page-threshold condition can be, for example, a single minimum or maximum value, both minimum and maximum value, or a range of values. As discussed above corresponding to FIG. 5F, automated composition evaluation system 100 determines whether ending-position of a certain column object satisfies a corresponding threshold condition. Ending positions of different columns, however, may also need to be balanced. Therefore, if automated composition evaluation system 100 determines that the differences of ending positions of columns satisfies the second threshold condition, such as greater than a minimum value, or less than a maximum value, it may generate, record, and/or store a corresponding finding (Step 509). If automated composition evaluation system 100 determines that differences are within an acceptable range defined in the composition rule, it may proceed to the next step.

Automated composition evaluation system 100, via evaluator 116 and rule engine 122, may execute software instructions to evaluate overlapping frames (Step 508), such as to determine whether frames overlap. A frame is a partition of a page, or several pages of the document. As discussed above, a frame may include one or more of the same type or different type of objects. For example, a frame may include several lines of texts or paragraphs that are close to each other. A frame may also include several tables. Therefore, automated composition evaluation system 100 may determine whether frames overlap with each other. For example, if a first frame include objects that are also included in a second frame, automated composition evaluation system 100 determines that there is an overlap of the first frame and the second frame, and it may generate, record, and/or store a corresponding finding (Step 509). If automated composition evaluation system 100 determines that there is no overlap of the frames, it may proceed to the next step to evaluate other parameters included in the metrics file based on the composition rules, or may proceed to an end of process 500.

One of ordinary skill in the art would appreciate that Steps 504, 506, and 508 of page evaluation processes 500 are for illustration only and not exhaustive or limiting. Automated composition evaluation system 100 may perform any other desired evaluation steps. The parameters, such as the differences of inter-line spacing, the differences of column-end positions and overlapping frames, are also referred to as page parameters. For example, automated composition evaluation system 100 may also perform evaluation process of any other page parameters included in the metrics file, such as those described corresponding to FIGS. 3A and 3B. In addition, automated composition evaluation system 100 may also perform some, but not all, Steps 504, 506, and 508 of page evaluation processes 500. Moreover, automated composition evaluation system 100 may also perform Steps 504, 506, and 508 of page evaluation processes 500 notwithstanding the sequence as shown in FIG. 6. For example, automated composition evaluation system 100 may perform Step 506 before it performs Step 504.

Figure 7:
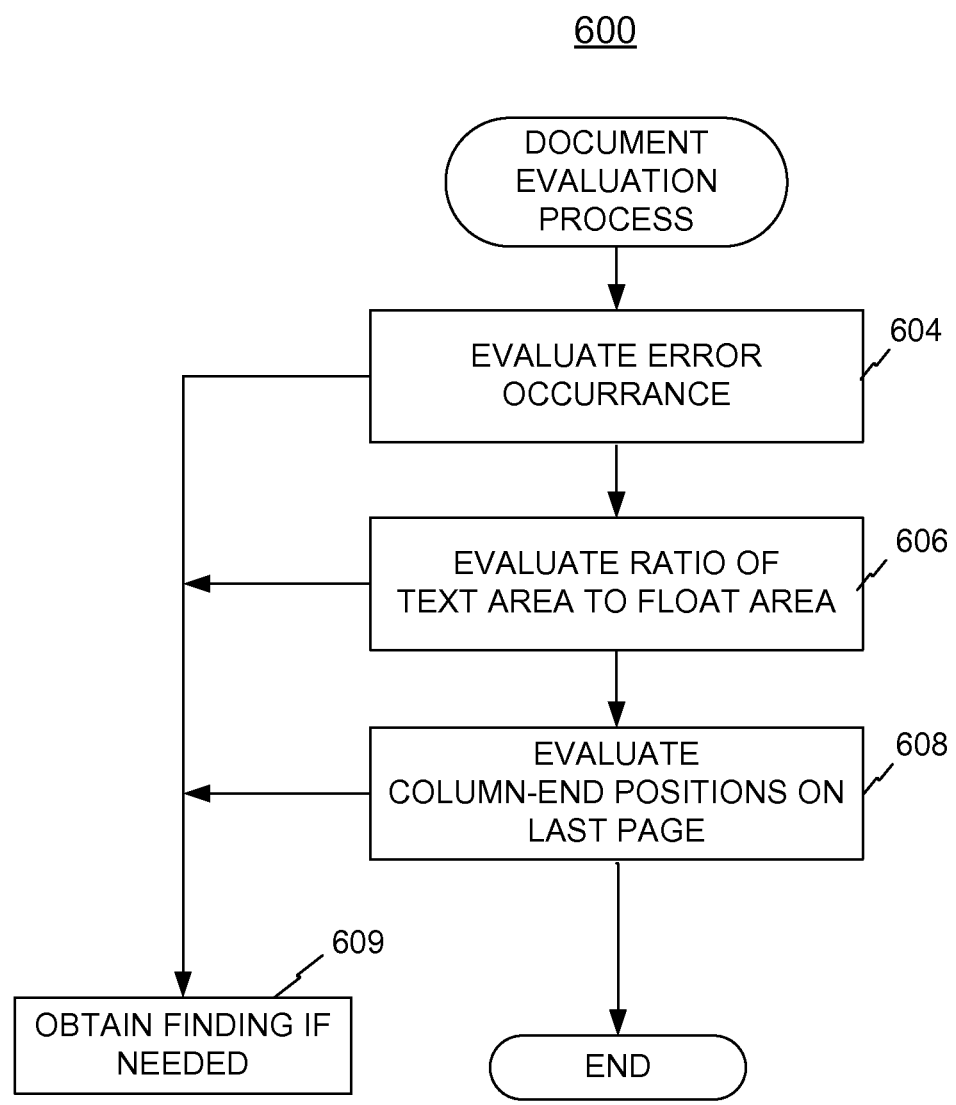
FIG. 7 is a flowchart of an exemplary document evaluation process consistent with certain disclosed embodiments.

FIG. 7 is a flowchart of an exemplary document evaluation process 600 consistent with certain disclosed embodiments. Document evaluation process 600, as well as any or all of the individual steps therein, may be performed by any components of automated composition evaluation system 100, including evaluator 116, rule engine 122 and processor 120. For exemplary purposes, FIG. 7 is disclosed as being performed by evaluator 116 and rule engine 122.

Automated composition evaluation system 100, via evaluator 116 and rule engine 122, may execute software instructions to evaluate error occurrence (Step 604), such as to determine whether at least one error occurred when evaluation the parameters based on the plurality of composition rules. As discussed above corresponding to FIGS. 5A-5F and 6, automated composition evaluation system 100 may perform one or more of evaluation processes, such as text evaluation process 400, callout evaluation process 410, table evaluation process 420, equation evaluation process 440, graphic evaluation process 450, column evaluation process 460, and page evaluation process 500. In Step 604, automated composition evaluation system 100 may determine whether any error or exception occurred during these evaluation processes. Automated composition evaluation system 100 may determine some errors and exceptions while performing the respective evaluation processes as described corresponding to FIGS. 5A-5F and 6. Some other errors and exceptions, however, may not be determined, captured, or otherwise detected during those processes. Therefore, these errors may be determined in Step 604. If automated composition evaluation system 100 determines that such errors or exceptions occurred, automated composition evaluation system 100 may generate, record, and/or store a corresponding finding (Step 609). If automated composition evaluation system 100 determines that no such error or exception occurred, it may proceed to the next step.

Automated composition evaluation system 100, via evaluator 116 and rule engine 122, may execute software instructions to evaluate ratio of text area to float area (Step 606), such as to determine whether an area ratio of a text area including at least one text object to the area of other objects, such as one or more of at least one table object, at least one equation object, and at least one graphic object, satisfies a first and a second document-threshold conditions. For example, automated composition evaluation system 100 may calculate, for a single page, multiple pages, or the whole document, a sum of the areas of all text objects and a sum of the areas of all non-text objects. If automated composition evaluation system 100 determines that the area ratio is less than a first file-threshold condition (such as 1), or greater than a second file-threshold condition, it may generate, record, and/or store a corresponding finding (Step 609). If automated composition evaluation system 100 determines that area ratio is within an acceptable range defined in the composition rule, it may proceed to the next step.

Automated composition evaluation system 100, via evaluator 116 and rule engine 122, may execute software instructions to evaluate column-end positions on last page (Step 608), such as to determine whether the end positions of columns on the last page satisfies a third file-threshold condition. As discussed above, because the content on the last pages may not occupy the whole page, end positions of columns on the last page may be different from the other pages. For example, the last page may have only one column occupying half of the vertical length of the page. If automated composition evaluation system 100 determines that the maximum of all end positions of columns on the last page is less than or equal to a third file-threshold condition, it may generate, record, and/or store a corresponding finding (Step 609). If automated composition evaluation system 100 determines that the maximum of all end positions of columns on the last page is in an acceptable range, it may proceed to the next step to evaluate other parameters included in the metrics file based on the composition rules, or may proceed to an end of process 600.

One of ordinary skill in the art would appreciate that Steps 604, 606, and 608 of document evaluation processes 600 are for illustration only and not exhaustive or limiting. Automated composition evaluation system 100 may perform any other desired evaluation steps. The number of error occurrences, the area ratio, and the column-end positions on last page of the document are sometimes also referred to document parameters. For example, automated composition evaluation system 100 may also perform evaluation process of any other document parameters included in the metrics file, such as those described corresponding to FIGS. 3A and 3B. In addition, automated composition evaluation system 100 may also perform some, but not all, Steps 604, 606, and 608 of page evaluation processes 600. Moreover, automated composition evaluation system 100 may also perform Steps 604, 606, and 608 of page evaluation processes 660 notwithstanding the sequence as shown in FIG. 7. For example, automated composition evaluation system 100 may perform Step 606 before it performs Step 604.

Figure 8:
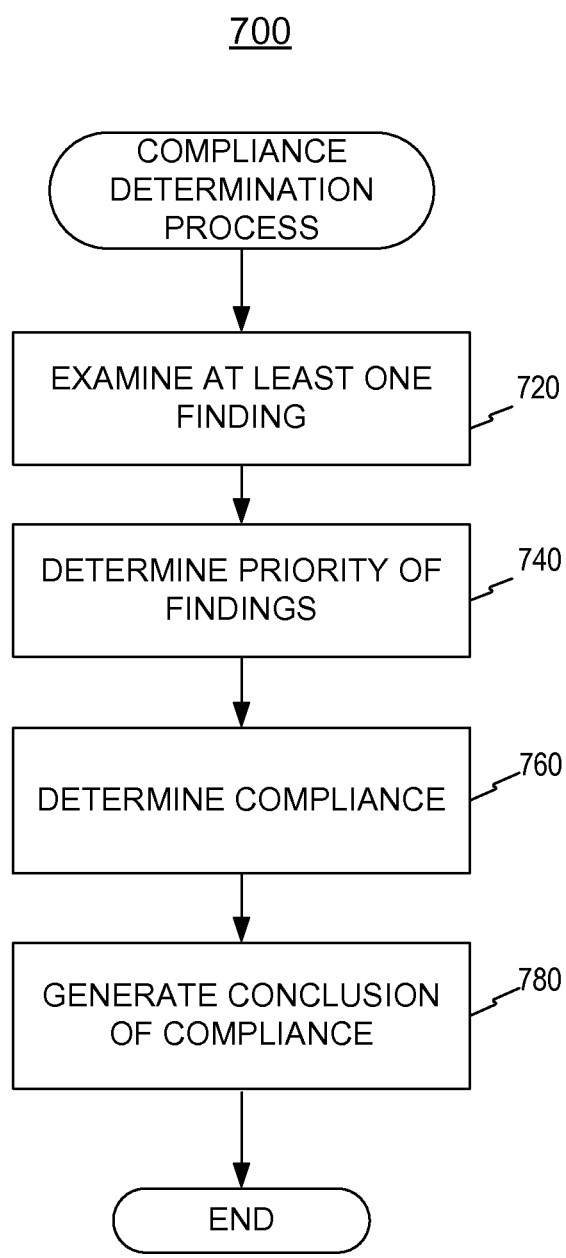
FIG. 8 is a flowchart of an exemplary compliance determination process consistent with certain disclosed embodiments.

FIG. 8 is a flowchart of an exemplary compliance determination process 700 consistent with certain disclosed embodiments. Compliance determination process 700, as well as any or all of the individual steps therein, may be performed by any components of automated composition evaluation system 100, including evaluator 116, rule engine 122 and processor 120. For exemplary purposes, FIG. 8 is disclosed as being performed by evaluator 116 and rule engine 122.

Automated composition evaluation system 100, via evaluator 116 and rule engine 122, may execute software instructions to examine, such as to obtain at least one finding corresponding to one or more of the objects, such as at least one of a text object, a table object, an equation object, a graphic object, a column, a page, and a document as a whole (Step 720). As discussed above corresponding to FIGS. 5A-5F, 6, and 7, automated composition evaluation system 100 may perform one or more evaluation processes and obtain one or more findings related to these processes. In Step 720, automated composition evaluation system 100 may selectively obtain some of these findings for determining compliance. As discussed above, some of the findings may include a "fail" status to indicate an unacceptable finding. Therefore, if a particular finding obtained in Step 720 indicates a "fail" status, automated composition evaluation system 100 may determine that the document is not in compliance with the composition rules and thus may not need to obtain other findings for determining compliance. In some embodiments, however, if the obtained findings indicate statuses other than a "fail" status, such as a "for information" status, automated composition evaluation system 100 may still obtain other findings. In some embodiments, automated composition evaluation system 100 may obtain all findings regardless of whether any of the findings indicates a "fail" status.

Automated composition evaluation system 100, via evaluator 116 and rule engine 122, may execute software instructions to determine priority data of the findings (Step 740) and determine whether the document being evaluated complies with the composition rules (Step 760) based on the priority data. As an example, priority data for a particular finding, or a combination of findings, may indicate that the finding is "conclusive" or "non-conclusive." A finding that is conclusive may indicate that the particular finding, or a combination of several findings, is sufficient for the automated composition evaluation system 100 to make deterministic conclusion of compliance. As an example, automated composition evaluation system 100 may have obtained three findings, all of which indicate "fail" statuses (or any other statuses such as "warning" or "information only"). Automated composition evaluation system 100 may determine that priority for each of the three findings individually is "non-conclusive." But automated composition evaluation system 100 may determine that combination of the three findings makes the priority "conclusive."

In some embodiments, priority data may indicate more than two types, such as the "conclusive" and "non-conclusive" statuses as described above. Instead, priority data may indicate any desired number of types, such as "conclusive", "early", "middle", and "non-conclusive". Moreover, rule engine 122 may define the composition rules such that conclusiveness of findings may be in any manner desired. For example, rule engine 122 may define that if an evaluation process results in two findings of "fail" status and one finding of "warning" statutes, the priority is conclusive. One of ordinary skill in the art would appreciate that any combinations of findings may be possible to indicate any type of priority data.

Based on the priority data, automated composition evaluation system 100 may determine whether the document is in compliance with the composition rules (Step 760). For example, if the priority data include one or more conclusive priority data, automated composition evaluation system 100 may determine the document is not in compliance with the composition rules. In some embodiments, if automated composition evaluation system 100 determines that the document is not in compliance, it may proceed to Step 780 to generate a report including the conclusion indicating such non-compliance.

In some embodiments, however, even if automated composition evaluation system 100 determines that the document is not in compliance, it may, via rule engine 122, adjust the composition rules and performs, for a second time, the evaluation processes, such as those described corresponding to FIGS. 5A-5E, 6, and 7. As an example, automated composition evaluation system 100 may determine that the non-compliance, although conclusive, may only be due to a small violation of the relevant composition rule. Automated composition evaluation system 100 may thus update, such as relax, some of the composition rules so that the rules are more tolerable. Automated composition evaluation system 100 may then re-run any or all of the aforementioned evaluation processes to determine whether the document comply with the updated composition rules. Moreover, the composition rules may also be updated from time to time to reflect, for example, a newly developed standard. Therefore, if a new set of composition rules are available, automated composition evaluation system 100 may also re-run any or all of the evaluation processes.

Automated composition evaluation system 100, via evaluator 116 and rule engine 122, may execute software instructions to generate a conclusion of compliance (Step 780). As discussed above, in Step 760, automated composition evaluation system 100 determines whether the input document is in compliance with the composition rules. In some embodiments, automated composition evaluation system 100 also generates a conclusion, such as a report, a message, or a screen display, to indicate to the user whether the document being evaluated is in compliance. In addition to generating a conclusion, in some embodiments, automated composition evaluation system 100 may also edit, change, or adjust the document being evaluated according to the findings, so as to bring the document to be in compliance with the composition rules.

One of ordinary skill in the art would appreciate that Steps 720, 740, 760, and 780 of compliance determination processes 700 are for illustration only and not exhaustive or limiting. Automated composition evaluation system 100 may perform any other desired evaluation steps. In addition, automated composition evaluation system 100 may also perform some, but not all, Steps 720, 740, 760, and 780 of page evaluation processes 700. Moreover, automated composition evaluation system 100 may also perform Steps 720, 740, 760, and 780 of page evaluation processes 700 notwithstanding the sequence as shown in FIG. 8.

Other features and functionalities will be apparent to those skilled in the art from consideration of the specification and practice of the disclosed embodiments. For example, the processes of FIGS. 2-8 are not limited to the sequences described above. Variations of these sequences, such as the removal and/or the addition of other process steps may be implemented without departing from the spirit and scope of the disclosed embodiments.

The features and other aspects and principles of the disclosed embodiments may be implemented in various environments. Such environments and related applications may be specifically constructed for performing the various processes and operations of the disclosed embodiments or they may include a general purpose computer or computing platform selectively activated or configured by program code to provide the necessary functionality. The processes disclosed herein may be implemented by a suitable combination of hardware, software, and/or firmware. For example, the disclosed embodiments may implement general purpose machines that may be configured to execute specialty software programs that perform processes consistent with the disclosed embodiments. Alternatively, the disclosed embodiments may implement a specialized apparatus or system configured to execute software programs that perform processes consistent with the disclosed embodiments.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as for example machine code (e.g., such as that produced by a compiler) and/or high level code that may be executed by a processor using an interpreter.

Additionally, the disclosed embodiments may be applied to different types of processes and operations. Any entity undertaking a complex task may employ systems, methods, and articles of manufacture consistent with certain principles related to the disclosed embodiments to plan, analyze, monitor, and complete the task. In addition, any entity associated with any phase of an article evaluation or publishing may also employ systems, methods, and articles of manufacture consistent with certain disclosed embodiments.

Furthermore, although aspects of the disclosed embodiments are described as being associated with data stored in memory and other tangible computer-readable storage mediums, one skilled in the art will appreciate that these aspects may also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents.

What is claimed is:

1. A method of evaluating composition of a first file representing a document to be evaluated, the method being performed by one or more processors operatively coupled to one or more memory devices and comprising:
    transforming the first file to a second file, the second file including a plurality of objects corresponding to the composition of the first file, wherein the plurality of objects include at least one text object;
    determining one or more parameters based on the plurality of objects, the one or more parameters including one or more text parameters associated with the at least one text object, one or more page parameters associated with at least one page of the document, and one or more document parameters associated with the document;
    evaluating the one or more parameters based on a plurality of composition rules provided by a rule engine;
    generating evaluation findings and storing the evaluation findings in the one or more memory devices; and
    generating an evaluation conclusion based on the evaluation findings, the evaluation conclusion indicating compliance of the document according to the composition rules.

2. The method of claim 1, wherein the second file is in an evaluator-standard extensible markup language (XML) file including at least one markup tag.

3. The method of claim 1, wherein the plurality of objects further comprising:
    at least one non-text object, the at least one non-text object including one or more of a table object, an equation object, a graphic object; and
    at least one column, the at least one column including at least one of the text object and the non-text object.

4. The method of claim 3, wherein determining the one or more parameters based on the plurality of objects comprises at least one of:
    obtaining one or more callout parameters associated with at least one callout, the at least one callout corresponding to one or more of the at least one table object, the at least one equation object, or the at least one graphic object; and
    obtaining one or more float parameters corresponding to one or more of the at least one table object, the at least one equation object, or the at least one graphic object.

5. The method of claim 4, wherein evaluating the one or more parameters based on the plurality of composition rules comprises:
    determining, based on at least one of the one or more callout parameters and the one or more float parameters, at least one of
        whether a dimension of one or more of the at least one table object, at least one equation object, and at least one graphic object satisfies a first callout-threshold condition;
        whether at least one of the one or more of the at least one table object, at least one equation object, and at least one graphic object cannot be placed; and
        whether at least one callout distance satisfies a second callout-threshold condition and a third callout-threshold condition, the at least one callout distance being calculated based on the callout parameters and the float parameters.

6. The method of claim 3, wherein determining the one or more parameters based on the plurality of objects comprises:
    determining one or more first table parameters associated with the at least one table object, the first table parameters corresponding to at least one first dimension of the at least one table object; and
    determining one or more second table parameters associated with the at least one table object, the second table parameters corresponding to at least one second dimension of at least one of a row and a column of the at least one table object.

7. The method of claim 6, wherein evaluating the one or more parameters based on the plurality of composition rules comprises:
    determining, based on at least one of the one or more first table parameters and the one or more second table parameters, at least one of
        whether a dimension of the at least one table object satisfies a first table-threshold condition, and
        whether a column data width satisfies a second table-threshold condition and a third table-threshold condition; and
    determining whether the at least one table object is banked.

8. The method of claim 3, wherein determining the one or more parameters based on the plurality of objects comprises:
    determining one or more equation parameters associated with the at least one equation object; and
    determining, corresponding to the at least on equation object, at least one character associated with at least one break.

9. The method of claim 8, wherein evaluating the one or more parameters based on the plurality of composition rules comprises at least one of:
   determining, based on the one or more equation parameters, whether a dimension of the at least one equation object satisfies a first equation-threshold condition; and
   determining, based on the at least one character associated with the at least one break, whether the at least one character satisfies a second equation-threshold condition.

10. The method of claim 3, wherein evaluating the one or more parameters based on the plurality of composition rules comprises at least one of:
   determining whether a dimension of the at least one graphic object satisfies a first graphic-threshold condition, and
   determining whether the at least one graphic object is rotated.

11. The method of claim 3, wherein evaluating the one or more parameters based on the plurality of composition rules comprises at least one of:
   determining whether a white space block satisfies a first column-threshold condition; and
   determining whether an ending position satisfies a second column-threshold condition and a third column-threshold condition.

12. The method of claim 3, wherein evaluating the one or more parameters based on the plurality of composition rules comprises determining, based on the one or more page parameters, at least one of:
   whether one or more differences of inter-line spacing of the at least one text object satisfy a first page-threshold condition; and
   whether one or more differences of column-end positions satisfy a second page-threshold condition.

13. The method of claim 3, wherein evaluating the one or more parameters based on the plurality of composition rules comprises determining, based on the one or more document parameters, at least one of:
   whether at least one error occurs when evaluating the one or more parameters based on the plurality of composition rules;
   whether an area ratio of the at least one text object to the at least one non-text object satisfies a first and a second file-threshold conditions; and
   whether column-end positions on last page of the document satisfy a third file-threshold condition.

14. The method of claim 3, wherein generating the evaluation findings comprises:
   generating the evaluation findings corresponding to one or more of the at least one text object, the at least one non-text object, the at least one column, the at least one page, and the first file; and
   determining priority data for the evaluation findings, the priority data including at least one of a conclusive priority and a non-conclusive priority.

15. The method of claim 14, wherein generating the evaluation conclusion based on the evaluation findings comprises determining whether the document complies with the composition rules based on the priority data.

16. The method of claim 1, wherein evaluating the one or more parameters based on the plurality of composition rules comprises:
   determining, based on the one or more text parameters associated with the at least one text object, at least one of:
      whether number of consecutive hyphens of the at least one text object satisfies a first text-threshold condition;
      whether one or more inter-character spacing satisfy a second text-threshold condition;
      whether one or more inter-word spacing satisfy a third text-threshold condition; and
      whether one or more inter-line spacing satisfy a fourth text-threshold condition.

17. A non-transitory computer-readable storage medium storing instructions that, when executed by a computer, cause the computer to perform a method of evaluating composition of a first file representing a document to be evaluated, the method being performed by one or more processors operatively coupled to one or more memory devices and comprising:
   transforming the first file to a second file, the second file including a plurality of objects corresponding to the composition of the first file, wherein the plurality of objects include at least one text object;
   determining one or more parameters based on the plurality of objects, the one or more parameters including one or more text parameters associated with the at least one text object, one or more page parameters associated with at least one page of the document, and one or more document parameters associated with the document;
   evaluating the one or more parameters based on a plurality of composition rules provided by a rule engine;
   generating evaluation findings and storing the evaluation findings in the one or more memory devices; and
   generating an evaluation conclusion based on the evaluation findings, the evaluation conclusion indicating compliance of the document according to the composition rules.

18. The computer-readable storage medium of claim 17, wherein the plurality of objects further comprising:
   at least one non-text object, the at least one non-text object including one or more of a table object, an equation object, a graphic object; and
   at least one column, the at least one column including at least one of the text object and the non-text object.

19. The computer-readable storage medium of claim 18, wherein determining the one or more parameters based on the plurality of objects comprises:
   determining one or more first table parameters associated with the at least one table object, the first table parameters corresponding to at least one first dimension of the at least one table object; and
   determining one or more second table parameters associated with the at least one table object, the second table parameters corresponding to at least one second dimension of at least one of a row and a column of the at least one table object.

20. The computer-readable storage medium of claim 19, wherein evaluating the one or more parameters based on the plurality of composition rules comprises:
   determining, based on at least one of the one or more first table parameters and the one or more second table parameters, at least one of
      whether a dimension of the at least one table object satisfies a first table-threshold condition, and
      whether a column data width satisfies a second table-threshold condition and a third table-threshold condition; and
   determining whether the at least one table object is banked.

21. The computer-readable storage medium of claim 18, wherein determining the one or more parameters based on the plurality of objects comprises:
  determining one or more equation parameters associated with the at least one equation object; and
  determining, corresponding to the at least on equation object, at least one character associated with at least one break.

22. The computer-readable storage medium of claim 21, wherein evaluating the one or more parameters based on the plurality of composition rules comprises at least one of:
  determining, based on the one or more equation parameters, whether a dimension of the at least one equation object satisfies a first equation-threshold condition; and
  determining, based on the at least one character associated with the at least one break, whether the at least one character satisfies a second equation-threshold condition.

23. The computer-readable storage medium of claim 18, wherein evaluating the one or more parameters based on the plurality of composition rules comprises at least one of:
  determining whether a dimension of the at least one graphic object satisfies a first graphic-threshold condition, and
  determining whether the at least one graphic object is rotated.

24. The computer-readable storage medium of claim 18, wherein evaluating the one or more parameters based on the plurality of composition rules comprises at least one of:
  determining whether a white space block satisfies a first column-threshold condition; and
  determining whether an ending position satisfies a second column-threshold condition and a third column-threshold condition.

25. The computer-readable storage medium of claim 18, wherein evaluating the one or more parameters based on the plurality of composition rules comprises determining, based on the one or more page parameters, at least one of:
  whether one or more differences of inter-line spacing of the at least one text object satisfy a first page-threshold condition; and
  whether one or more differences of column-end positions satisfy a second page-threshold condition.

26. The computer-readable storage medium of claim 18, wherein evaluating the one or more document parameters based on the plurality of composition rules comprises determining, based on the one or more document parameters, at least one of:
  whether at least one error occurs when evaluating the one or more parameters based on the plurality of composition rules;
  whether an area ratio of the at least one text object to the at least one non-text object satisfies a first and a second file-threshold conditions; and
  whether column-end positions on last page of the document satisfy a third file-threshold condition.

27. The computer-readable storage medium of claim 18, wherein generating the evaluation findings comprises:
  generating the evaluation findings corresponding to one or more of the at least one text object, the at least one non-text object, the at least one column, the at least one page, and the first file; and
  determining priority data for the evaluation findings, the priority data including at least one of a conclusive priority and a non-conclusive priority.

28. The computer-readable storage medium of claim 27, wherein generating the evaluation conclusion based on the evaluation findings comprises determining whether the document complies with the composition rules based on the priority data.

29. The computer-readable storage medium of claim 17, wherein evaluating the one or more parameters based on the plurality of composition rules comprises:
  determining, based on the one or more text parameters associated with the at least one text object, at least one of
    whether number of consecutive hyphens of the at least one text object satisfies a first text-threshold condition;
    whether one or more inter-character spacing satisfy a second text-threshold condition;
    whether one or more inter-word spacing satisfy a third text-threshold condition; and
    whether one or more inter-line spacing satisfy a fourth text-threshold condition.

30. A system for evaluating composition of a first file representing a document to be evaluated, the system comprising:
  a processor configured to transform the first file to a second file, the second file including a plurality of objects corresponding to the composition of the first file, wherein the plurality of objects include at least one text object;
  an interpreter configured to determine one or more parameters based on the plurality of objects, the one or more parameters including one or more text parameters associated with the at least one text object, one or more page parameters associated with at least one page of the document, and one or more document parameters associated with the document;
  an evaluator configured to
    evaluate, based on a plurality of composition rules provided by a rule engine, the one or more parameters;
    generate evaluation findings and store the evaluation findings in one or more memory devices; and
    generate an evaluation conclusion based on the evaluation findings, the evaluation conclusion indicating compliance of the document according to the composition rules.

* * * * *